US010927211B2

(12) United States Patent
Masuda et al.

(10) Patent No.: US 10,927,211 B2
(45) Date of Patent: Feb. 23, 2021

(54) BLOCK COPOLYMER HYDROGENATE, RESIN COMPOSITION, AND APPLICATIONS THEREOF

(71) Applicant: KURARAY CO., LTD., Kurashiki (JP)

(72) Inventors: Mikio Masuda, Kamisu (JP); Yasushi Senda, Kamisu (JP); Masahiro Kato, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/638,510

(22) PCT Filed: Nov. 21, 2018

(86) PCT No.: PCT/JP2018/043021
§ 371 (c)(1),
(2) Date: Feb. 12, 2020

(87) PCT Pub. No.: WO2019/103047
PCT Pub. Date: May 31, 2019

(65) Prior Publication Data
US 2020/0362084 A1    Nov. 19, 2020

(30) Foreign Application Priority Data

Nov. 22, 2017  (JP) .............................. JP2017-225089
May 31, 2018   (JP) .............................. JP2018-105640

(51) Int. Cl.
*C08L 23/00*   (2006.01)
*C08F 297/04*  (2006.01)
*C08L 53/02*   (2006.01)
*C08L 69/00*   (2006.01)
*C08L 81/04*   (2006.01)
*C08L 77/00*   (2006.01)
*C08L 71/12*   (2006.01)
*C08L 25/06*   (2006.01)
*C08L 59/00*   (2006.01)
*C08L 67/03*   (2006.01)
*C08L 15/00*   (2006.01)
*C08L 23/06*   (2006.01)
*C08L 23/12*   (2006.01)
*C08K 5/01*    (2006.01)
*C09J 153/02*  (2006.01)

(52) U.S. Cl.
CPC ............ *C08F 297/046* (2013.01); *C08K 5/01* (2013.01); *C08L 15/005* (2013.01); *C08L 23/00* (2013.01); *C08L 23/06* (2013.01); *C08L 23/12* (2013.01); *C08L 25/06* (2013.01); *C08L 53/025* (2013.01); *C08L 59/00* (2013.01); *C08L 67/03* (2013.01); *C08L 69/00* (2013.01); *C08L 71/12* (2013.01); *C08L 77/00* (2013.01); *C08L 81/04* (2013.01); *C09J 153/025* (2013.01); *C08F 2410/04* (2013.01); *C08L 2205/025* (2013.01); *C08L 2205/03* (2013.01)

(58) Field of Classification Search
CPC .... C08F 297/046; C08L 23/00; C08L 15/005; C08K 5/01
See application file for complete search history.

(56) References Cited

U.S. PATENT DOCUMENTS

| | | | |
|---|---|---|---|
| 2013/0157069 A1 | 6/2013 | Minamide et al. | |
| 2015/0197588 A1 | 7/2015 | Uehara et al. | |
| 2017/0361575 A1 | 12/2017 | Kusudou et al. | |
| 2018/0215912 A1 | 8/2018 | Cruz Tejedor et al. | |
| 2018/0244822 A1 | 8/2018 | Kusanose et al. | |
| 2018/0251589 A1 | 9/2018 | Kusanose et al. | |

FOREIGN PATENT DOCUMENTS

| | | | |
|---|---|---|---|
| JP | 5-202287 A | 8/1993 | |
| JP | 7-238111 A | 9/1995 | |
| JP | 2002-284830 A | 10/2002 | |
| JP | 2007-16134 A | 1/2007 | |

(Continued)

OTHER PUBLICATIONS

International Search Report dated Feb. 19, 2019 in PCT/JP2018/043021 filed on Nov. 21, 2018, 2 pages.
Korean Office Action dated May 21, 2020 in Korean Patent Application No. 10-2020-7004880, 5 pages.

Primary Examiner — Peter D. Mulcahy
(74) Attorney, Agent, or Firm — Oblon, McClelland, Maier & Neustadt, L.L.P.

(57) ABSTRACT

A block copolymer hydrogenate, which is a hydrogenate of a block copolymer having a polymer block (A) containing a structural unit derived from an aromatic vinyl compound in an amount of more than 70 mol %, and a polymer block (B) containing a structural unit derived from a conjugated diene compound in an amount of 30 mol % or more, and further satisfies the following requirements: Requirement (1): The content of the polymer block (A) in the block copolymer hydrogenate is 1 to 30% by mass. Requirement (2): The conjugated diene compound contains isoprene. Requirement (3): A total content of the 1,2-bond unit and the 3,4-bond unit in the structural units derived from the conjugated diene compound is 60 mol % or more. Requirement (4): The hydrogenation rate of the polymer block (B) is 60 mol % or more. Requirement (5): The block copolymer hydrogenate has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.0 or more, and the maximum width of the temperature range is 16° C. or more.

20 Claims, 4 Drawing Sheets

(56) References Cited

FOREIGN PATENT DOCUMENTS

| | | |
|---|---|---|
| JP | 2016-108224 A | 6/2016 |
| KR | 10-2013-0097167 A | 9/2013 |
| TW | 201716451 A | 5/2017 |
| WO | WO 2013/183570 A1 | 12/2013 |
| WO | WO 2015/156334 A1 | 10/2015 |
| WO | WO 2017/016975 A1 | 2/2017 |
| WO | WO 2017/043542 A1 | 3/2017 |

BLOCK COPOLYMER HYDROGENATE, RESIN COMPOSITION, AND APPLICATIONS THEREOF

TECHNICAL FIELD

The present invention relates to a block copolymer hydrogenate and a resin composition containing the same. Further, the present invention relates to various applications of the block copolymer hydrogenate and the resin composition.

BACKGROUND ART

Some block copolymer hydrogenates having a polymer block containing a structural unit derived from an aromatic vinyl compound and a polymer block containing a structural unit derived from a conjugated diene compound, in which the structural unit derived from a conjugated diene compound has a vinyl bond unit (for example, a 1,2-bond unit and a 3,4-bond unit), may be used as a vibration damping material, and it is generally known that tan δ measured according to JIS K7244-10 can be an index of vibration damping performance.

Heretofore, as a component to be contained in a resin composition for the purpose of providing a vibration damping material excellent in mechanical strength, heat resistance and oil resistance, there is known a block copolymer or a hydrogenate thereof having a predetermined number-average molecular weight and composed of a block (A) having a predetermined number-average molecular weight and containing (a) a predetermined amount of a thermoplastic resin having a specific polar group in the molecular chain and (b) at least one vinyl aromatic monomer, and a block (B) having a predetermined number-average molecular weight and containing isoprene, butadiene or isoprene-butadiene in which the vinyl bond amount (content of a 1,2-bond unit and a 3,4-bond unit) is 30% or more (see PTL 1). The literature describes that the block copolymer having a vinyl bond content of less than 30% is unfavorable since the block copolymer of the type could not secure sufficient vibration damping performance in an ordinary service temperature range.

Also for the purpose of providing a block copolymer excellent in vibration damping performance in a high temperature area and excellent in high flowability and moldability, there is known a block copolymer composed of a polymer block A formed of an aromatic vinyl monomer and having a predetermined number-average molecular weight and a polymer block B formed of a mixture of isoprene and styrene and having a predetermined number-average molecular weight where the vinyl bond amount of the isoprene unit is 30 to 60% of all isoprene units, in which the bonding morphology of the polymer blocks A and B is represented by A-(B-A)n or (A-B)n, and which has a predetermined number-average molecular weight, and has a main dispersion peak of tan δ at 30° C. or higher (see PTL 2). The literature says that, by using isoprene and styrene as the monomer components to form the polymer block B and by controlling the content of the 3,4-bond unit and the 1,2-bond unit of isoprene units to fall within a range of 30% to 60% of all the isoprene units, the block copolymer can be made to have a main dispersion peak of tan δ at 30° C. or higher, and accordingly the vibration damping performance thereof at room temperature to a high temperature range can be thereby improved, and describes that, from the viewpoint of maintaining high-temperature vibration damping performance, the content of the 3,4-bond unit and the 1,2-bond unit of isoprene units in the polymer block B needs to fall within a range of 30% to 60% of all the isoprene units.

Further, PTL 3 describes a liquid-packaging container formed of a laminate that contains a resin composition containing a thermoplastic elastomer (2) produced by hydrogenating a block copolymer having a polymer block (A) mainly consisting of a structural unit derived from an aromatic vinyl compound, and a polymer block (B) mainly consisting of a structural unit derived from a conjugated diene compound and having a vinyl bond structural unit content of 50 mol % or more, wherein 80 mol % or more of the carbon-carbon double bond that the polymer block (B) has is hydrogenated, but describes nothing as to what type of thermal elastomer could express high vibration damping performance in a broad temperature range.

CITATION LIST

Patent Literature

PTL 1: JP 05-202287 A
PTL 2: JP 2002-284830 A
PTL 3: WO2015/156334

SUMMARY OF INVENTION

Technical Problem

Heretofore, by controlling the main dispersion peak temperature of tan δ of a block copolymer, the vibration damping performance thereof at the main dispersion peak temperature is increased, but in this case, it is necessary to individually plan the block copolymer every time in accordance with the temperature of the environment for use thereof, which, however, is difficult in the case where the temperature of the usage environment changes or in the case where the same block copolymer is used in various applications differing in temperature environments.

Accordingly, an object of the present invention is to provide a block copolymer hydrogenate, which is a hydrogenate of a block copolymer having a polymer block (A) containing a predetermined amount of a structural unit derived from an aromatic vinyl compound and a polymer block (B) containing a predetermined amount of a structural unit derived from a conjugated diene compound, and has high vibration damping performance in a broad temperature range.

Solution to Problem

The present inventors have found that a block copolymer hydrogenate having a specific configuration and having a serial wide temperature range where tan δ is 1.0 or more can solve the above-mentioned problems and have completed the present invention.

The present invention relates to the following [1] to [26].
[1] A block copolymer hydrogenate, which is a hydrogenate of a block copolymer having a polymer block (A) containing a structural unit derived from an aromatic vinyl compound in an amount of more than 70 mol %, and a polymer block (B) containing a structural unit derived from a conjugated diene compound in an amount of 30 mol % or more, and further satisfies the following requirements:
Requirement (1): The content of the polymer block (A) in the block copolymer hydrogenate is from 1 to 30% by mass;
Requirement (2): The conjugated diene compound contains isoprene;

Requirement (3): A total content of the 1,2-bond unit and the 3,4-bond unit in the structural units derived from the conjugated diene compound is 60 mol % or more;

Requirement (4): The hydrogenation rate of the polymer block (B) is 60 mol % or more; and Requirement (5): The block copolymer hydrogenate has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.0 or more, and the maximum width of the temperature range is 16° C. or more.

[2] The block copolymer hydrogenate according to the above [1], wherein in the requirement (1), the content of the polymer block (A) in the block copolymer hydrogenate is from 2 to 18% by mass.

[3] The block copolymer hydrogenate according to the above [1] or [2], wherein in the requirement (2), the conjugated diene compound contains isoprene in an amount of 20% by mass or more.

[4] The block copolymer hydrogenate according to any one of the above [1] to [3], wherein in the requirement (2), the conjugated diene compound contains isoprene in an amount of 90% by mass or more.

[5] The block copolymer hydrogenate according to any one of the above [1] to [4], wherein in the requirement (3), a total content of the 1,2-bond unit and the 3,4-bond unit in the structural units derived from the conjugated diene compound is 70 mol % or more.

[6] The block copolymer hydrogenate according to any one of the above [1] to [5], wherein in the requirement (4), the hydrogenation rate of the polymer block (B) is 80 mol % or more.

[7] The block copolymer hydrogenate according to any one of the above [1] to [6], wherein the conjugated diene compound is a mixture of isoprene and butadiene, and a ratio of the peak area at a chemical shift value of 24 to 25 ppm to the peak area at a chemical shift value of 5 to 50 ppm, as measured according to $^{13}$C-NMR, is 4% or less.

[8] The block copolymer hydrogenate according to any one of the above [1] to [7], having a weight-average molecular weight of 20,000 to 800,000.

[9] The block copolymer hydrogenate according to any one of the above [1] to [8], wherein a morphology of a film having a thickness of 1 mm thereof, as prepared by molding under the following molding condition, has a spherical microphase-separated structure:

Molding condition: Pressing at a temperature of 230° C. under a pressure of 10 MPa for 3 minutes.

[10] The block copolymer hydrogenate according to any one of the above [1] to [9], further satisfying the following requirement (6):

Requirement (6): The block copolymer hydrogenate has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.5 or more, and the maximum width of the temperature range is 9° C. or more.

[11] The block copolymer hydrogenate according to any one of the above [1] to [10], further satisfying the following requirement (7):

Requirement (7): A maximum value of the peak intensity at tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.7 or more.

[12] The block copolymer hydrogenate according to any one of the above [1] to [11], further satisfying the following requirement (8):

Requirement (8): The hydrogenation rate of the aromatic vinyl compound in the polymer block (A) is 8 mol % or less.

[13] The block copolymer hydrogenate according to any one of the above [1] to [12], containing 2,2-di(2-tetrahydrofuryl)propane.

[14] The block copolymer hydrogenate according to any one of the above [1] to [13], which contains none of dimethyl ether, diethyl ether, tetrahydrofuran (THF), ethylene glycol dimethyl ether, diethylene glycol dimethyl ether, triethylamine, N,N,N',N'-tetramethylenediamine (TMEDA) and N-methylmorpholine, or in which the content of these is 1 ppm or less each.

[15] A resin composition containing the block copolymer hydrogenate of any of the above [1] to [14].

[16] A pellet containing the block copolymer hydrogenate of any of the above [1] to [14] or the resin composition of the above [15].

[17] A bale containing the block copolymer hydrogenate of any of the above [1] to [14] or the resin composition of the above [15].

[18] A molded article produced by molding the block copolymer hydrogenate of any of the above [1] to [14] or the resin composition of the above [15].

[19] A vibration damping material containing the block copolymer hydrogenate of any of the above [1] to [14] or the resin composition of the above [15].

[20] A sound insulator containing the block copolymer hydrogenate of any of the above [1] to [14] or the resin composition of the above [15].

[21] An interlayer film for laminated glass containing the block copolymer hydrogenate of any of the above [1] to [14] or the resin composition of the above [15].

[22] A rubber dam containing the block copolymer hydrogenate of any of the above [1] to [14] or the resin composition of the above [15].

[23] A shoe sole material containing the block copolymer hydrogenate of any of the above [1] to [14] or the resin composition of the above [15].

[24] A floor material containing the block copolymer hydrogenate of any of the above [1] to [14] or the resin composition of the above [15].

[25] A bonding adhesive or a pressure-sensitive adhesive containing the block copolymer hydrogenate of any of the above [1] to [14] or the resin composition of the above [15].

[26] A laminate having an X layer that contains the block copolymer hydrogenate of any of the above [1] to [14] or the resin composition of the above [15], and a Y layer laminated on at least one surface of the X layer.

Advantageous Effects of Invention

According to the present invention, there can be provided a block copolymer hydrogenate, which is a hydrogenate of a block copolymer having a polymer block (A) containing predetermined amount of a structural unit derived from an aromatic vinyl compound, and a polymer block (B) containing a predetermined amount of a structural unit derived from a conjugated diene compound, and has high vibration damping performance in a broad temperature range.

DESCRIPTION OF EMBODIMENTS

Figure 1:
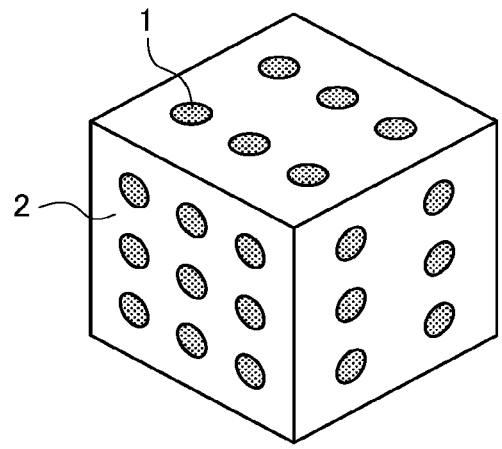
FIG. 1 is a schematic view of a spherical microphase-separated structure.

Embodiments of arbitrarily selecting the matters described in this description or embodiments of arbitrarily combining them are included in the present invention.
[Block Copolymer Hydrogenate]

The present invention provides a block copolymer hydrogenate, which is a hydrogenate of a block copolymer having a polymer block (A) containing a structural unit derived from an aromatic vinyl compound in an amount of more than 70 mol %, and a polymer block (B) containing a structural unit derived from a conjugated diene compound in an amount of 30 mol % or more, and further satisfies the following requirements.

Requirement (1): The content of the polymer block (A) in the block copolymer hydrogenate is 1 to 30% by mass.

Requirement (2): The conjugated diene compound contains isoprene.

Requirement (3): A total content of the 1,2-bond unit and the 3,4-bond unit (hereinafter this may be referred to as a vinyl bond amount) in the structural units derived from the conjugated diene compound is 60 mol % or more.

Requirement (4): The hydrogenation rate of the polymer block (B) is 60 mol % or more.

Requirement (5): The block copolymer hydrogenate has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.0 or more, and the maximum width of the temperature range is 16° C. or more.

In this description, a block copolymer hydrogenate may be referred to as a hydrogenated block copolymer.

Regarding vibration damping performance, in general, tan δ of 1.0 or more is said to be good, and the hydrogenated block copolymer of the present invention satisfies the above-mentioned requirement (5) and therefore can attain high vibration damping performance over a broad temperature range. Various requirements to satisfy the requirement (5) may be taken into consideration, but the requirements (1) to (4) are important. According to the requirement (1), the peak top intensity of tan δ can be increased and therefore the temperature range where tan δ is 1.0 or more tends to broaden, but on the other hand, by satisfying the requirements (2) to (4), the side chain can be more bulky to decrease the mobility of the main chain so that the mobility difference between the main chain and the side chain can increase to provide gentle glass transition relative to temperature change and, as a result, the peak of tan δ to be given by measurement temperature change can be high in a broad reason as one reason for high vibration damping performance of the hydrogenated block copolymer of the present invention in a broad temperature range.

For use as vibration damping materials, the requirement (4) needs to be satisfied from the viewpoint of weather resistance, and in the present invention, from the viewpoint of satisfying both weather resistance and high vibration damping performance in a broad temperature range, all the requirements (1) to (5) need to be satisfied.

Hereinunder the hydrogenated block copolymer of the type of the present invention is described in detail.

The hydrogenated block copolymer of the present invention is a block copolymer hydrogenate having the above-mentioned polymer block (A) and the above-mentioned polymer block (B).
(Polymer Block (A))

The polymer block (A) containing a structural unit derived from an aromatic vinyl compound (hereinafter this may be abbreviated as "aromatic vinyl compound unit") in an amount of more than 70 mol %, and from the viewpoint of mechanical properties, preferably 80 mol % or more, more preferably 85 mol % or more, even more preferably 90 mol % or more, especially more preferably 95 mol % or more, and the amount may be substantially 100 mol %.

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, silyl group-substituted styrene derivatives, indene, vinylnaphthalene, and N-vinylcarbazole. One alone of these aromatic vinyl compounds may be used singly, or two or more thereof may be used as combined. Above all, from the viewpoint of a balance of production cost and physical properties, styrene, α-methylstyrene, p-methylstyrene and a mixture thereof are preferred, and styrene is more preferred.

However, within a range not detracting from the object and the advantageous effects of the present invention, the polymer block (A) may contain a structural unit derived from any other unsaturated monomer than aromatic vinyl compounds (hereinunder this may be abbreviated as "other unsaturated monomer unit") in a ratio of 30 mol % or less. Examples of the other unsaturated monomer include at least one selected from the group consisting of butadiene, isoprene, 2,3-dimethylbutadiene, 1,3-pentadiene, 1,3-hexadiene, isobutylene, methyl methacrylate, methyl vinyl ether, β-pinene, 8,9-p-menthene, dipentene, methylene norbornene and 2-methylene tetrahydrofuran. The bonding mode in the case where polymer block (A) contains the other unsaturated monomer unit is not specifically limited, and may be any of a random form or a tapered form.

The content of the structural unit derived from the other unsaturated monomer unit in the polymer block (A) is preferably 10 mol % or less, more preferably 5 mol % or less, even more preferably 0 mol %.

The block copolymer may have the above-mentioned at least one polymer block (A). In the case where the block copolymer has 2 or more polymer blocks (A), these polymer blocks (A) may be the same as or different from each other. In this description, "polymer blocks differ" means that polymer blocks differ in at least one of the monomer unit constituting the polymer block, the weight-average molecular weight, the stereoregularity and, when the polymer block has plural monomer units, the ratio of each monomer unit and the copolymerization conformation (random, gradient, block).

In the present invention, preferably, the block copolymer has the above-mentioned two polymer blocks (A).

The weight-average molecular weight (Mw) of the polymer block (A) constituting the block copolymer is, though not specifically limited, preferably such that the weight-average molecular weight of at least one polymer block (A) that the block copolymer has is 3,000 to 60,000, more preferably 4,000 to 50,000. The block copolymer having at least one polymer block (A) whose weight-average molecular weight falls within the above-mentioned range secures more improved mechanical strength and excellent film formability.

All the "weight-average molecular weight" described in the description and the claims is a standard polystyrene-equivalent weight-average molecular weight measured through gel permeation chromatography (GPC), and in detail, the measurement method described in the section of Examples may be referred to. The weight-average molecular weight of each polymer block (A) that the block copolymer has may be determined by analyzing a liquid that is to be sampled every time after polymerization for producing each polymer block in the production step. For example, in the case of a triblock copolymer having a configuration A1-B-A2, the weight-average molecular weight of the first polymer block A1 and the polymer bock B are determined according to the above-mentioned method, and the resultant data are subtracted from the weight-average molecular weight of the block copolymer to determine the weight-average molecular weight of the second polymer block A2. As another method, in the case of a triblock copolymer having a configuration A1-B-A2, the total weight-average molecular weight of the polymer block (A) is calculated from the weight-average molecular weight of the block copolymer and the total content of the polymer block (A) confirmed through $^1$H-NMR, and the weight-average molecular weight of the deactivated first polymer block A1 is calculated through GPC, and the latter is subtracted from the former to determine the weight-average molecular weight of the second polymer block A2.

The hydrogenated block copolymer of the present invention satisfies the following requirement (1).
<Requirement (1)>
Requirement (1): The content of the polymer block (A) in the block copolymer (in the case where the block copolymer has plural polymer blocks (A), the total content thereof) is 1 to 30% by mass.

When the content of the polymer block (A) is less than 1% by mass, hydrogenated block copolymer pellets are difficult to form. On the other hand, when the content is more than 30% by mass, the tan δ peak top intensity lowers, and if so, the maximum width of the temperature range where tan δ can be 1.0 or more, as defined in the requirement (5), narrows and, in addition, the copolymer is poor in flexibility and moldability. From the same viewpoint, the content of the polymer block (A) is preferably 2 to 27% by mass, more preferably 2 to 18% by mass, even more preferably 3 to 18% by mass, and especially more preferably 3 to 15% by mass. Taking handleability and mechanical properties of the film to be formed into consideration, the content is preferably 6 to 18% by mass, more preferably 6 to 15% by mass, even more preferably 7 to 15% by mass, especially more preferably 8 to 15% by mass, and most preferably 10 to 15% by mass.

The content of the polymer block (A) in the block copolymer is a value determined through $^1$H-NMR, and is more precisely a value measured according to the method described in the section of Examples.
(Polymer Block (B))

The polymer block (B) is a polymer block containing a structural unit derived from a conjugated diene compound in an amount of 30 mol % or more, preferably 50 mol % or more, more preferably 65 mol % or more, even more preferably 80 mol % or more.

Regarding the polymer block (B), the hydrogenated block copolymer of the present invention satisfies the following requirement (2).
<Requirement (2)>
Requirement (2): The conjugated diene compound contains isoprene.

Preferably, the conjugated diene compound contains isoprene in an amount of 20% by mass or more, more preferably 40% by mass or more, and further may contain in an amount of 70% by mass or more, and may contain in an amount of 90% by mass or more.

The polymer block (B) may contain a structural unit derived from isoprene alone in an amount of 30 mol % or more, and may contain a structural unit derived from two or more kinds of conjugated diene compounds in an amount of 30 mol % or more, so far as it satisfies the above-mentioned requirement (2).

In addition to isoprene, the conjugated diene compound includes butadiene, hexadiene, 2,3-dimethyl-1,3-butadiene, 1,3-pentadiene, and myrcene. The conjugated diene compound is preferably isoprene or a mixture of isoprene and butadiene, and is more preferably isoprene.

In the case where the conjugated diene compound is a mixture of butadiene and isoprene, the blending ratio thereof [isoprene/butadiene] (ratio by mass) is, though not specifically limited thereto, preferably 5/95 to 95/5, more preferably 10/90 to 90/10, even more preferably 40/60 to 70/30, and especially more preferably 45/55 to 65/35. The blending ratio [isoprene/butadiene] is, as a ratio by mol, preferably 5/95 to 95/5, more preferably 10/90 to 90/10, even more preferably 40/60 to 70/30, and especially more preferably 45/55 to 55/45.

In the case where the conjugated diene compound is a mixture of butadiene and isoprene, a ratio of the peak area falling within a chemical shift value of 24 to 25 ppm to the peak area falling within a chemical shift value of 5 to 50 ppm, as measured through $^{13}$C-NMR, is, from the viewpoint of vibration damping performance, preferably 4% or less, more preferably 2% or less, even more preferably 1% or less, and most preferably 0.5% or less. The peak falling within a chemical shift value of 5 to 50 ppm, as measured through $^{13}$C-NMR, corresponds to the total structural unit in the polymer block (B), and the peak falling within a chemical shift value of 24 to 25 ppm corresponds to a site where a structural unit derived from isoprene continues at a 1,4-bond. More precisely, the areal ratio can be determined according to the method described in the section of Examples.

In other words, also preferably, the polymer block (B) contains a structural unit derived from isoprene (hereinafter this may be abbreviated as "isoprene unit") in an amount of 30 mol % or more, or also preferably contains a structural unit derived from a mixture of isoprene and butadiene (hereinafter this may be abbreviated as "isoprene and butadiene mixture unit") in an amount of 30 mol % or more.

In the case where the polymer block (B) contains two or more kinds of structural units, the bonding form thereof may be any of a random, tapered, completely alternate, partly block, or block form or may be a combination of two or more thereof.

(Vinyl Bond Amount in Polymer Block (B))

In the case where the structural unit constituting the polymer block (B) is any of a isoprene unit, or an isoprene and butadiene mixture unit, the bonding form of isoprene and butadiene is referred to. Butadiene may take any of a 1,2-bond or a 1,4-bond; and isoprene may take any of a 1,2-bond, a 3,4-bond or a 1,4-bond.

Regarding the vinyl bond amount relative to the polymer block (B), the hydrogenated block copolymer of the present invention satisfies the following requirement (3).

<Requirement (3)>

Requirement (3): In the block copolymer, a total content of the 3,4-bond unit and the 1,2-bond unit (that is, the vinyl bond amount) in the polymer block (B) is 60 mol % or more.

The vinyl bond amount is preferably 65 mol % or more, more preferably 70 mol % or more, even more preferably 75 mol % or more, further more preferably 80 mol % or more, especially more preferably 82 mol % or more, and most preferably 85 mol % or more. Also, though not specifically limited thereto, the upper limit of the vinyl bond amount in the polymer block (B) may be 95 mol %, or may be 92 mol %, or may be 90 mol %. Here, the vinyl bond amount is a value calculated through $^1$H-NMR according to the method described in the section of Examples.

The weight-average molecular weight of the total of the polymer block (B) that the block copolymer has is, from the viewpoint of vibration damping performance, in a state before hydrogenation, preferably 15,000 to 800,000, more preferably 50,000 to 700,000, even more preferably 70,000 to 600,000, especially more preferably 90,000 to 500,000, and most preferably 130,000 to 450,000.

The polymer block (B) may contain, within a range not detracting from the object and the advantageous effects of the present invention, a structural unit derived from any other polymerizable monomer than the above-mentioned conjugated diene compound. In this case, in the polymer block (B), the content of the structural unit derived from the other polymerizable monomer than the conjugated diene compound is preferably less than 70 mol %, more preferably less than 50 mol %, even more preferably less than 35 mol %, and especially more preferably less than 20 mol %. The lower limit of the content of the structural unit derived from the other polymerizable monomer than the conjugated diene compound may be, though not specifically limited thereto, 0 mol %, or may be 5 mol %, or may be 10 mol %.

For example, the other polymerizable monomer is preferably at least one compound selected from the group consisting of aromatic vinyl compounds such as styrene, α-methylstyrene, o-methylstyrene, m-methylstyrene, p-methylstyrene, p-t-butylstyrene, 2,4-dimethylstyrene, N-vinylcarbazole, vinylnaphthalene and vinylanthracene, as well as methyl methacrylate, methyl vinyl ether, β-pinene, 8,9-p-menthene, dipentene, methylene norbornene, 2-methylene tetrahydrofuran, 1,3-cyclopentadiene, 1,3-cyclohexadiene, 1,3-cycloheptadiene, and 1,3-cyclooctadiene. Above all, styrene, α-methylstyrene, and p-methylstyrene are preferred, and styrene is more preferred.

In the case where the polymer block (B) contains a structural unit derived from the other polymerizable monomer than the conjugated diene compound, a preferred combination thereof is isoprene and styrene.

In the case where the polymer block (B) contains a structural unit derived from the other polymerizable monomer than the conjugated diene compound, the bonding form is not specifically limited and may be any of a random or tapered form, but is preferably a random form.

The block copolymer may have the above-mentioned at least one polymer block (B). In the case where the block copolymer has 2 or more polymer blocks (B), these polymer blocks (B) may be the same as or different from each other.

In the present invention, preferably, the block copolymer has the above-mentioned only one polymer block (B).

(Bonding Mode of Polymer Block (A) and Polymer Block (B))

So far as the polymer block (A) and the polymer block (B) bond in the block copolymer, the bonding mode thereof is not specifically limited, and may be any bonding mode of a linear, branched or radial bonding mode or a bonding mode of a combination of two or more thereof. Above all, the bonding form of the polymer block (A) and the polymer block (B) is preferably a linear one, and examples thereof include a diblock copolymer represented by A-B where the polymer block (A) is represented by A and the polymer block (B) is by B, a triblock copolymer represented by A-B-A or B-A-B, a tetrablock copolymer represented by A-B-A-B, a pentablock copolymer represented by A-B-A-B-A or B-A-B-A-B, and an (A-B)nX-type copolymer (where X represents a coupling agent residue, and n represents an integer of 3 or more). Above all, a triblock copolymer or a diblock copolymer that is liner is preferred, and a triblock copolymer of a type of A-B-A is preferably used from the viewpoint of flexibility and easiness in production.

Here, in this description, in the case where polymer blocks of the same type bond linearly via a Bifunctional coupling agent or the like, all the bonding polymer blocks are handled as one polymer block. Accordingly, including the above-mentioned exemplifications, a polymer block that is, in nature, strictly expressed as Y-X-Y (where X represents a coupling agent residue) is expressed as Y as a whole, excepting a case that needs to be differentiated from a polymer block Y alone. In this description, the polymer block of the type including a coupling agent residue is handled as above and, therefore, for example, a block copolymer that includes a coupling agent residue and is to be strictly expressed as A-B-X-B-A (where X represents a coupling agent residue) is expressed as A-B-A and is handled as one example of a triblock copolymer.

The present invention provides a hydrogenate of the above-mentioned block copolymer.

Regarding the polymer block (B), the hydrogenated block copolymer of the present invention satisfies the following requirement (4).

<Requirement (4)>

Requirement (4): The hydrogenation rate of the polymer block (B) is 60 mol % or more. Namely, 60 mol % or more of the carbon-carbon double bonds that the polymer block (B) has are hydrogenated.

When the hydrogenation rate of the polymer block (B) is high, the block copolymer hydrogenate can be excellent in vibration damping performance heat resistance and weather resistance in a broad temperature range. From the same viewpoint, the hydrogenation rate of the polymer block (B) is preferably 70 mol % or more, more preferably 80 mol % or more, even more preferably 85 mol % or more, especially more preferably 90 mol % or more, and most preferably 93 mol % or more. The value can be referred to as a hydrogenation rate. The upper limit of the hydrogenation rate is not specifically limited, but the upper limit may be 99 mol %, and may be 98 mol %.

The hydrogenation rate is a value determined by measuring the content of the carbon-carbon double bond in the structural unit derived from the conjugated diene compound in the polymer block (B) through $^1$H-NMR after hydrogenation, and in more detail, this is a value measured according to the method described in the section of Examples.

(Weight-Average Molecular Weight (Mw) of Hydrogenated Block Copolymer)

The weight-average molecular weight (Mw) of the hydrogenated block copolymer determined through gel permeation chromatography as a standard polystyrene-equivalent weight-average molecular weight thereof is preferably 20,000 to 800,000, more preferably 50,000 to 700,000, even more preferably 50,000 to 500,000, especially more preferably 50,000 to 450,000, and most preferably 80,000 to 400,000. When the weight-average molecular weight of the block copolymer is 20,000 or more, heat resistance thereof may be high, and when it is 800,000 or less, moldability thereof may be good.

The hydrogenated block copolymer of the present invention may have one kind or two or more kinds of functional groups such as a carboxy group, a hydroxy group, an acid anhydride group, an amino group and an epoxy group in the molecular chain and/or the molecular terminal within a range not detracting from the object and the advantageous effects of the present invention.

The hydrogenated block copolymer of the present invention satisfies the following requirement (5).

<Requirement (5)>

Requirement (5): The hydrogenated block copolymer has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.0 or more, and the maximum width of the temperature range is 16° C. or more.

Here, the "serial temperature range where tan δ is 1.0 or more" indicates a continuing temperature range where tan δ is 1.0 or more, that is, in the temperature range, tan δ is always 1.0 or more.

A test piece for measuring the tan δ is prepared by pressing at a temperature of 230° C. and under a pressure of 10 MPa for 3 minutes using a pressing apparatus "NF-50T" (available from Shinto Metal Industries Corporation) to give a sheet having a thickness of 1.0 mm followed by blanking the sheet to give a disc having a diameter of 8 mm, and the disc is used as a test piece.

In the present invention, a tan δ measurement apparatus is not specifically limited, but for example, a rotary rheometer "ARES-G2" (available from TA Instruments Corporation) may be used, in which the above-mentioned test piece is sandwiched between flat plates having a diameter of 8 mm to test it.

Satisfying the requirement (5), the hydrogenated block copolymer can be excellent in vibration damping performance in a broad temperature range.

The maximum width of the temperature range is preferably 17° C. or more, more preferably 18° C. or more, even more preferably 19° C. or more, and especially more preferably 20° C. or more. The upper limit of the maximum width is not specifically limited, and may be 30° C., or may be 25° C., or may be 23° C., or may be 22° C.

Not specifically limited, the hydrogenated block copolymer of the present invention preferably satisfies the following requirement (6) from the viewpoint of expressing excellent vibration damping performance in a broad temperature range.

<Requirement (6)>

Requirement (6): The hydrogenated block copolymer has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.5 or more, and the maximum width of the temperature range is 9° C. or more.

A higher tan δ value indicates more excellent vibration damping performance, and satisfying the requirement (6), the hydrogenated block copolymer has higher vibration damping performance in a broad temperature range.

Here, the "serial temperature range where tan δ is 1.5 or more" indicates a continuing temperature range where tan δ is 1.5 or more, that is, in the temperature range, tan δ is always 1.5 or more.

Regarding the test piece for measuring the tan δ, reference may be made to the description of the requirement (5) given hereinabove.

The maximum width of the temperature range is preferably 6° C. or more, more preferably 8° C. or more, even more preferably 9° C. or more, and especially more preferably 10° C. or more. The upper limit of the maximum width is not specifically limited, and may be 15° C., or may be 13° C.

The hydrogenated block copolymer of the present invention exhibits excellent vibration damping performance in a broad temperature range as mentioned above, but from the viewpoint that the maximum value of vibration damping performance is preferably higher, the hydrogenated block copolymer preferably further satisfies the following requirement (7).

<Requirement (7)>

Requirement (7): A maximum value of the peak intensity (peak top intensity) of tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.7 or more.

Regarding the test piece for measuring the tan δ, reference may be made to the description of the requirement (5) given hereinabove.

The peak top intensity is preferably 1.8 or more, more preferably 1.9 or more, even more preferably 2.0 or more, and especially more preferably 2.1 or more. The upper limit of the peak top intensity is not specifically limited, and may be 3.0, or may be 2.6, or may be 2.5, or may be 2.4.

<Peak Top Temperature>

Of the hydrogenated block copolymer of the present invention, the temperature at the peak top intensity, that is, the peak top temperature at tan δ is preferably −20° C. or higher, more preferably −10° C. or higher, even more preferably 0° C. or higher, further more preferably 5° C. or higher, and may be 10° C. or higher, or may be 14° C. or higher, or may be 20° C. or higher, or may be 25° C. or higher, or may be 30° C. or higher. The upper limit of the peak top temperature at tan δ may fall within any range not detracting from the advantageous effects of the present invention, and may be 60° C. or lower, or may be 50° C. or lower, or may be 40° C. or lower, or may be 35° C. or lower.

The range of the peak top temperature at tan δ is, for example, preferably −20 to 60° C., more preferably −10 to 50° C., even more preferably 0 to 40° C., and further more preferably 5 to 35° C. When the peak top temperature at tan δ is −20° C. or higher, the hydrogenated block copolymer can secure sufficient vibration damping performance in actual use environments, and when it is 60° C. or lower, the hydrogenated block copolymer can satisfy the requirement of hardness in accordance with the intended use thereof and can satisfy desired adhesiveness in use thereof as a bonding adhesive or as a pressure-sensitive adhesive.

Of the hydrogenated block copolymer of the present invention, a preferred range of the peak top temperature is as described above, that is, the hydrogenated block copolymer has high vibration damping performance in a broad temperature range and can be therefore excellent in vibration damping performance even in relatively high temperature conditions. In addition, the hydrogenated block copolymer of the present invention hardly degrades even when kneaded with a resin to be a composition thereof, and is therefore effective for improving vibration damping performance of resins for use in high-temperature conditions.

The hydrogenated block copolymer of the present invention preferably satisfies the following requirement (8) from the viewpoint of mechanical properties thereof.
<Requirement (8)>

Requirement (8): The hydrogenation rate of the aromatic vinyl compound in the polymer block (A) is 8 mol % or less.

The hydrogenation rate of the aromatic vinyl compound is preferably 6 mol % or less, more preferably 5 mol % or less, even more preferably 4 mol % or less, especially more preferably 3.5 mol % or less, and most preferably 2.5% by mass.

When the hydrogenation rate falls within the above range, the hydrogenated block copolymer can have assumed mechanical properties.

The hydrogenation rate can be determined from the content of the aromatic vinyl compound before hydrogenation and the content of the aromatic vinyl compound after hydrogenation, and more precisely, it is a value measured according to the method described in the section of Examples.

The hydrogenated block copolymer of the present invention preferably satisfies the following requirement (9) from the viewpoint of mechanical properties thereof.
<Requirement (9)>

The block ratio of the polymer block (A) is preferably 66% or more, more preferably 70% or more, even more preferably 78% or more, and especially more preferably 82% or more.

Here, the block ratio is a ratio of the structural unit derived from an aromatic vinyl compound and existing as a block to the structural unit constituting the polymer block (A), and is calculated according to the method described hereinunder. Here, the "structural unit derived from an aromatic vinyl compound and existing as a block" means one that gives a peak on a higher magnetic field side than 6.6 ppm in $^1$H-NMR peaks derived from an aromatic ring of the structural unit.

In the case where structural units derived from an aromatic vinyl compound exist adjacent to each other as a block, the $^1$H-NMR derived from the aromatic ring appears at least on a higher magnetic field side than 6.6 ppm. On the other hand, a moiety of a structural unit derived from an aromatic vinyl compound, which is adjacent to a structural unit not having an aromatic ring but does not exist as a block, does not give a peak on a higher magnetic field side than 6.6 ppm, but gives a peak on a lower magnetic field side than 6.6 ppm. Here, examples of the structural unit not having an aromatic ring include a structural unit derived from an unsaturated monomer such as a diene, and a structural unit derived from a nucleus-hydrogenated aromatic vinyl compound.

The block ratio of the polymer block (A) can be determined by dissolving a hydrogenated block copolymer in CDCl$_3$, then analyzing the resultant solution through $^1$H-NMR [apparatus: "ADVANCE 400 Nano Bay" (available from Bruker Corporation), measurement temperature: 30° C.], and calculating the peak area on a higher magnetic field side and the peak area on a lower magnetic field side than 6.6 ppm among the peaks appearing in a range of 6.0 ppm to 7.5 ppm.

(Morphology)

Figure 2:
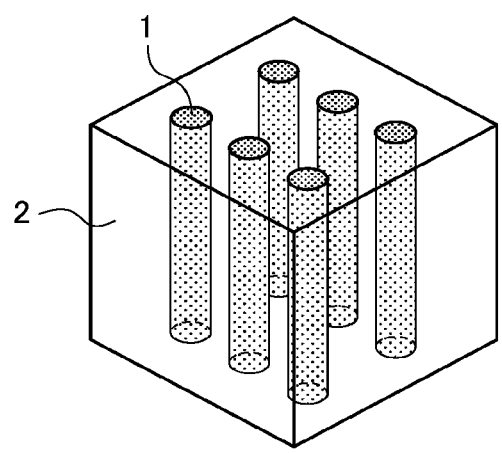
FIG. 2 is a schematic view of a cylindrical microphase-separated structure.

The hydrogenated block copolymer of the present invention is such that the morphology of a film having a thickness of 1 mm, as prepared by pressing the hydrogenated block copolymer at a temperature of 230° C. and under a pressure of 10 MPa for 3 minutes, has a spherical microphase-separated structure as shown in FIG. 1 or a cylindrical microphase-separated structure as shown in FIG. 2. Here, the morphology of a film is observed, but it may be considered that the hydrogenated block copolymer itself before molded into a film can have the same morphology.

In the case where the film has a spherical microphase-separated structure, the polymer block (A) forms spheres and exists in the polymer block (B); while on the other hand, in the case where the film has a cylindrical microphase-separated structure, the polymer block (A) forms cylinders and exists in the polymer block (B). When the content of the polymer block (A) is smaller, the film tends to have a spherical microphase-separated structure.

The film produced by molding the copolymer in the manner as above has a morphology of a spherical or cylindrical microphase-separated structure, therefore exhibiting further higher vibration damping performance. From the same viewpoint, the morphology of the film preferably has a spherical microphase-separated structure.

Figure 3:
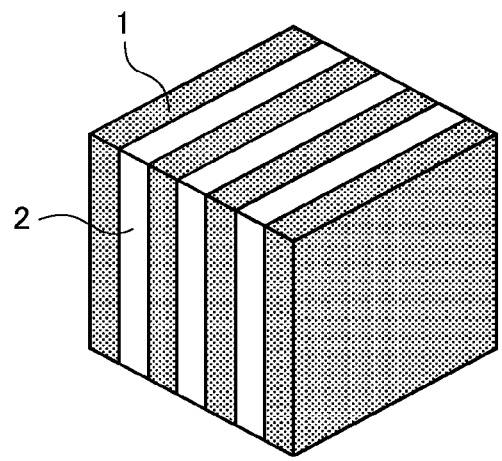
FIG. 3 is a schematic view of a lamellar microphase-separated structure.
Figure 4:
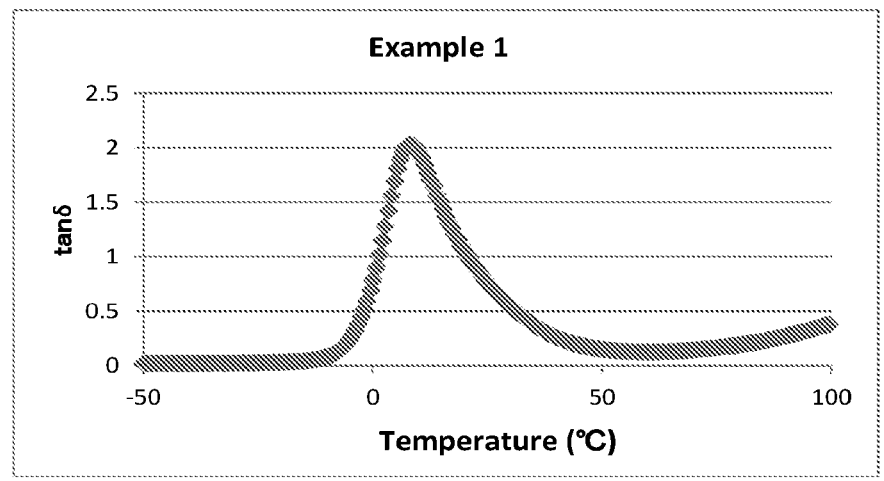
FIG. 4 is a graph showing a peak of tan δ of the block copolymer hydrogenate obtained in Example 1.
Figure 5:
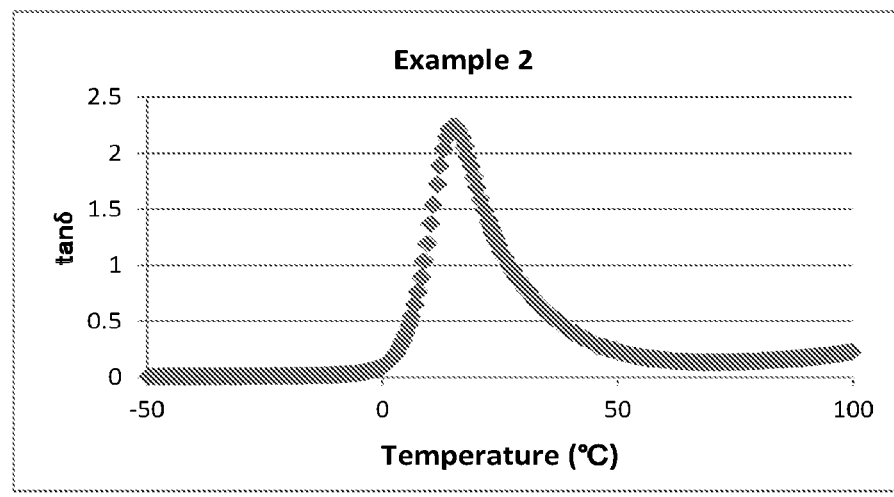
FIG. 5 is a graph showing a peak of tan δ of the block copolymer hydrogenate obtained in Example 2.
Figure 6:
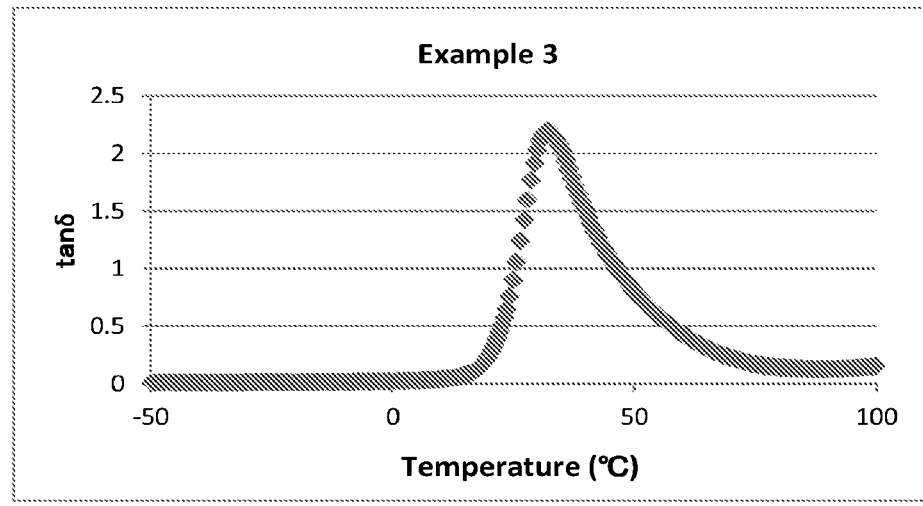
FIG. 6 is a graph showing a peak of tan δ of the block copolymer hydrogenate obtained in Example 3.
Figure 7:
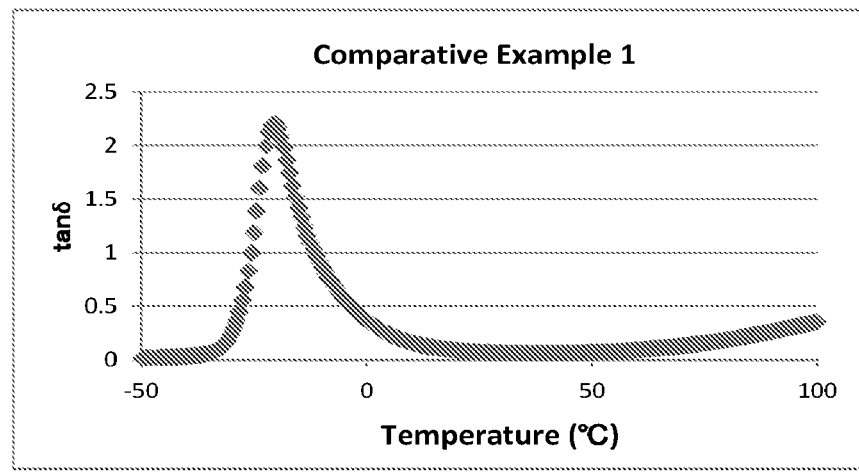
FIG. 7 is a graph showing a peak of tan δ of the block copolymer hydrogenate obtained in Comparative Example 1.
Figure 8:
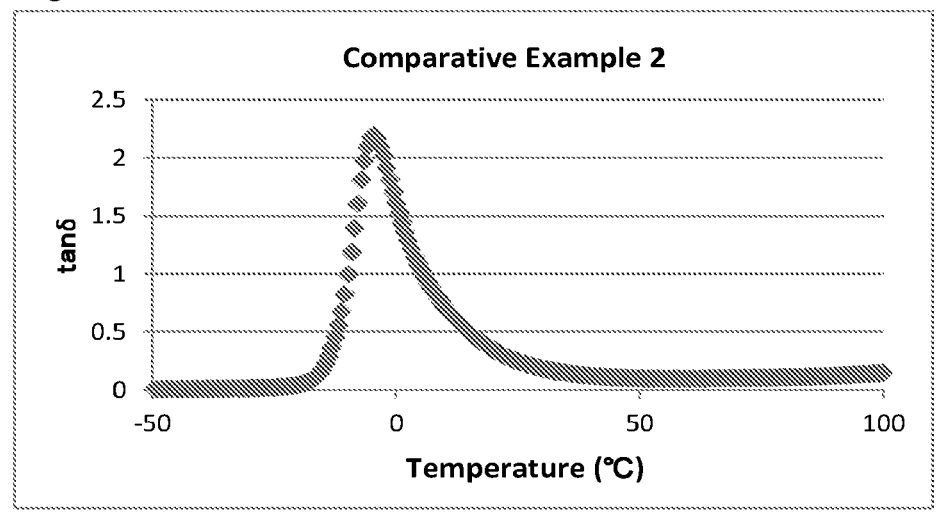
FIG. 8 is a graph showing a peak of tan δ of the block copolymer hydrogenate obtained in Comparative Example 2.
Figure 9:
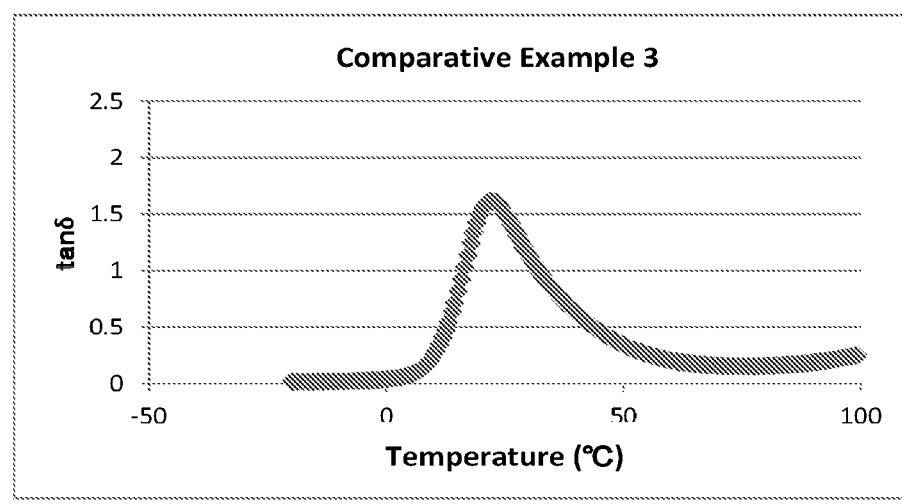
FIG. 9 is a graph showing a peak of tan δ of the block copolymer hydrogenate obtained in Comparative Example 3.

In the case where the film has a lamellar microphase-separated structure where a layer of the polymer block (A) and a layer of the polymer block (B) are layered alternately, as shown in FIG. 3, the film is poor in moldability and vibration damping performance.

Regarding a more detailed observation method for morphology, reference may be made to the method described in the section of Examples.

(Production Method for Hydrogenated Block Copolymer)

The hydrogenated block copolymer of the present invention can be produced, for example, according to a solution polymerization method, an emulsion polymerization method or a solid-phase polymerization method. Above all, a solution polymerization method is preferred, and for example, any known method of an ionic polymerization method of anionic polymerization or cationic polymerization, or a radical polymerization method is employable. Above all, an anionic polymerization method is preferred. In an anionic polymerization method, an aromatic vinyl compound and at least one selected from the group consisting of a conjugated diene compound and isobutylene are successively added in the presence of a solvent, an anionic polymerization initiator and optionally a Lewis base to give a block copolymer, and is optionally reacted with a coupling agent added thereto, and then the resultant block copolymer is hydrogenated to give a hydrogenated block copolymer.

Preferably, the production method for the hydrogenated block copolymer is carried out under a relatively mild condition as described below, from the viewpoint of keeping tan δ of the aromatic vinyl compound high in a broad range and retarding nucleus-hydrogenation.

Examples of an organic lithium compound usable as a polymerization initiator for anionic polymerization of the above-mentioned method include methyl lithium, ethyl lithium, n-butyl lithium, sec-butyl lithium, tert-butyl lithium, and pentyl lithium. Examples of a dilithium compound usable as a polymerization initiator include naphthalene dilithium, and dilithiohexylbenzene.

Examples of the coupling agent include dichloromethane, dibromomethane, dichloroethane, dibromoethane, dibromobenzene, and phenyl benzoate.

The amount to be used of these polymerization initiator and coupling agent can be appropriately determined depending on the desired weight-average molecular weight of the intended hydrogenated block copolymer. In general, the amount to be used of the initiator such as an alkyl lithium compound or a dilithium compound is preferably in a ratio of 0.01 to 0.2 parts by mass relative to 100 parts by mass of the total of the monomers such as an aromatic vinyl compound and a conjugated diene compound used for polymerization, and in the case where a coupling agent is used, the amount thereof is preferably in a ratio of 0.001 to 0.8 parts by mass relative to 100 parts by mass of the total of the monomers.

The solvent is not specifically limited so far as it does not have any negative influence on anionic polymerization reaction, and examples thereof include aliphatic hydrocarbons such as cyclohexane, methylcyclohexane, n-hexane and n-pentane; and aromatic hydrocarbons such as benzene, toluene and xylene. The polymerization reaction is carried out generally at a temperature of 0 to 100° C., preferably 10 to 70° C., and for 0.5 to 50 hours, preferably 1 to 30 hours.

By adding a Lewis base as a cocatalyst (vinylating agent) during polymerization, the content of the 3,4-bond and the 1,2-bond (vinyl bond amount) in the polymer block (B) can be increased. In the present invention, for solving the above-mentioned problems, 2,2-di(2-tetrahydrofuryl)propane [DTHFP] is preferably used as the Lewis base. Using DTHFP, both a vinyl bond amount and a hydrogenation rate can be increased under mild conditions though isoprene is contained in the conjugated diene compound, and accordingly, a block copolymer hydrogenate excellent in mechanical properties and having a broad temperature range where tan δ is 1.0 or more can be obtained. Further, as mentioned above, the requirements (1) to (4) are important for satisfying the requirement (5), and in addition thereto, the requirement (5) can be satisfied more favorably by using DTHFP.

Heretofore, for increasing the vinyl bond amount in a block copolymer hydrogenate, in general, a Lewis base is used as a vinylating agent. As the Lewis base, ethers such as tetrahydrofuran (THF) and amines such as N,N,N',N'-tetramethylethylenediamine (TMEDA) have been used (see paragraph in PTL 2).

However, in the block copolymer hydrogenate having a polymer block (A) containing a structural unit derived from an aromatic vinyl compound and a polymer block (B) containing a structural unit derived from a conjugated diene compound, for example, when the polymer block (B) is formed of butadiene alone, it is relatively easy to attain both an increased vinyl bond amount and an increased hydrogenation rate even according to a conventional method because of the low steric barrier of butadiene.

However, from the viewpoint of increasing the peak at tan δ in a broad range, which is an object of the present invention, the polymer block (B) needs to contain isoprene, but in the case where it contains isoprene, it is difficult to increase both a vinyl bond amount and a hydrogenation rate because of the high steric barrier of isoprene.

For example, as in Production Example 7 in PTL 3, there is known a case where both a vinyl bond amount and a hydrogenation rate are high. However, in the literature, TMEDA is used as a vinylating agent, but TMEDA deactivates a hydrogenation catalyst, and therefore a large amount of a hydrogenation catalyst needs to be used, and in this case, though the reason is unclear, it is difficult to increase the peak at tan δ in a broad range even when a vinyl bond amount and a hydrogenation rate are numerically high.

In addition, it has been found that, in the case where a large amount of a hydrogenation catalyst is used as described above, there occurs nucleus-hydrogenation of hydrogenating the benzene ring of the polymer block (A) and therefore the resultant block copolymer hydrogenate could not have mechanical properties necessary for a vibration damping material.

The present inventors have found that, by using DTHFP as a vinylating agent, even a block copolymer containing isoprene can satisfy both an increased vinyl bond amount and an increased hydrogenation rate under mild conditions not using a large amount of a hydrogenation agent. By satisfying both an increased vinyl bond amount and an increased hydrogenation rate under mild conditions, it is possible to obtain a block copolymer having a high hydrogenation rate and having a high peak at tan δ in a broad range.

Within a range not detracting from the advantageous effects of the present invention, any other Lewis base may be used along with DTHFP. Examples of the other Lewis base include ethers such as dimethyl ether, diethyl ether, and tetrahydrofuran; glycol ethers such as ethylene glycol dimethyl ether, and diethylene glycol dimethyl ether; and amines such as triethylamine, N,N,N',N'-tetramethylenediamine, and N-methylmorpholine.

The amount of DTHFP to be added is determined how the vinyl bond amount of the isoprene unit and/or the butadiene unit constituting the polymer block (B) is controlled. Accordingly, the amount of the Lewis base to be added is, from the viewpoint of satisfying the requirement (3), generally in a range of 0.1 to 1,000 mols, preferably 0.3 to 100 mols, most preferably 0.5 to 10 mols, relative to 1 gram atom of lithium contained in the alkyl lithium compound or the dilithium compound used as a polymerization initiator.

After polymerization according to the above-mentioned method, an active hydrogen compound such as alcohols, carboxylic acids or water is added to terminate the polymerization reaction. Subsequently, the resultant copolymer is hydrogenated in the presence of a hydrogenation catalyst in an inert organic solvent. The hydrogenation reaction can be carried out under a hydrogen pressure of 0.1 to 20 MPa, preferably 0.5 to 15 MPa, more preferably 0.5 to 5 MPa, at a reaction temperature of 20 to 250° C., preferably 50 to 180° C., more preferably 70 to 180° C., for a reaction time of generally 0.1 to 100 hours, preferably 1 to 50 hours.

From the viewpoint of carrying out hydrogenation of the polymer block (B) while retarding nucleus-hydrogenation of an aromatic vinyl compound, the hydrogenation catalyst may be selected from, for example, a Raney nickel; a Ziegler catalyst containing a combination of a transition metal compound and an alkyl aluminum compound or an alkyl lithium compound; and a metallocene catalyst. From the same viewpoint, above all, a Ziegler catalyst is preferred, a Ziegler catalyst containing a combination of a transition metal compound and an alkyl aluminum compound is more preferred, and a Ziegler catalyst containing a combination of a nickel compound and an alkylaluminum compound (Al/Ni-base Ziegler catalyst) is even more preferred.

The hydrogenated block copolymer produced in the manner as above may be taken out by pouring the polymerization reaction liquid into methanol or the like for solidification therein, and then heating or drying it under reduced pressure, or by pouring the polymerization reaction liquid into hot water along with steam thereinto to thereby remove the solvent through azeotropy for so-called steam stripping, and then heating or drying it under reduced pressure.

In the resultant hydrogenated block copolymer of the present invention, though not specifically limited, the Lewis base used tends to remain therein. Namely, the hydrogenated block copolymer of the present invention may contain 2,2-di(2-tetrahydrofuryl)propane [DTHFP] and, in general, tends to contain DTHFP in an amount of 5 ppm by mass or more, or may contain DTHFP in an amount of 10 ppm by mass or more. The upper limit of the content of DTHFP is generally 2000 ppm by mass, and may be 1000 ppm by mass, or may be 500 ppm by mass, or may be 250 ppm by mass.

On the other hand, according to the above-mentioned production method, the hydrogenated block copolymer of the present invention does not contain any other Lewis base (vinylating agent) than DTHFP, specifically any of dimethyl ether, diethyl ether, tetrahydrofuran (THF), ethylene glycol dimethyl ether, diethylene glycol dimethyl ether, triethylamine, N,N,N',N'-tetramethylenediamine (TMEDA) and N-methylmorpholine, or the content of each therein tends to be 1 ppm or less.

Though not specifically limited, the content of the Lewis base in the hydrogenated block copolymer may be determined through $^1$H-NMR or gas chromatography.

[Resin Composition]

The hydrogenated block copolymer of the present invention or a resin composition containing the hydrogenated block copolymer can be appropriately formed into pellets, bales, powders or the like.

The present invention also provides a molded article produced by molding the hydrogenated block copolymer of the present invention or a resin composition containing the hydrogenated block copolymer.

The resin composition may contain other materials such as other polymers than the hydrogenated block copolymer of the present invention and various additives. The other polymer is not specifically limited so far as it does not detract from the advantageous effects of the present invention, and any resin such as a thermosetting resin and a thermoplastic resin can be used. From the viewpoint of compatibility and moldability, a thermoplastic resin (including a thermoplastic elastomer) is preferred.

The thermoplastic elastomer includes an olefinic resin, a polyphenylene ether resin, a polyamide resin, a polyester resin, an acrylic resin, a polyoxymethylene resin, a styrenic resin, a polycarbonate resin, an isobutylene-isoprene copolymer rubber and the like elastomer, a polyphenylene sulfide resin, and a polyacetal resin. One kind alone or two or more kinds of these thermoplastic resins may be used either singly or as combined.

For more specific compounds of the thermoplastic resin, there are mentioned the same compounds as those exemplified hereinunder as polymers that may be mixed in the hydrogenated block copolymer of the present invention.

The content ratio of the hydrogenated block copolymer of the present invention to the thermoplastic resin [hydrogenated block copolymer/thermoplastic resin] is, as a ratio by mass, preferably 99/1 to 1/99, more preferably 90/10 to 5/95, even more preferably 90/10 to 7/93, further more preferably 90/10 to 10/90. The content ratio may be controlled from the viewpoint of vibration damping performance, mechanical properties and moldability. Increasing the content ratio of the hydrogenated block copolymer tends to improve vibration damping performance.

A production method for the resin composition is not specifically limited, for which any known method is employable. For example, the hydrogenated block copolymer of the present invention and other materials are mixed using a mixing machine such as a Henschel mixer, a V blender, a ribbon blender, a tumbler blender, or a conical blender to produce a resin composition, or after mixing them, the resultant mixture is melt-kneaded using a single-screw extruder, a twin-screw extruder or a kneader to produce a resin composition. In the case of producing a foamed article, for example, a resin mixture dry-blended with a foaming agent is injected into a mold equipped with a cavity having a desired shape and molded therein with foaming.

[Use]

The hydrogenated block copolymer of the present invention and the resin composition containing the hydrogenated block copolymer are excellent in vibration damping performance. Accordingly, the present invention is useful as a vibration damping material, an acoustic insulating material, an interlayer film for laminated glass, a rubber dam, a sole material, a floor material, a bonding adhesive or a pressure-sensitive adhesive, a gear and a gear box containing the hydrogenated block copolymer of the present invention or the resin composition. Further, the hydrogenated block copolymer or the resin composition can also be used as a weather strip and a floor mat.

In addition, the hydrogenated block copolymer of the present invention and the resin composition containing the hydrogenated block copolymer can also be used in an automotive field, for example, as cooling parts such as a thermostat housing, a radiator tank, a radiator hose, a water outlet, a water pump housing, and a rear joint; air intake and exhaust system parts such as an intercooler tank, an intercooler case, a turbo duct pipe, an EGR cooler case, a resonator, a throttle body, an intake manifold, and a tail pipe; fuel system parts such as a fuel delivery pipe, a gasoline tank, a quick connector, a canister, a pump module, a fuel pipe, an oil strainer, a lock nut, and a sealant material; structural parts such as a mount bracket, a torque rod, and a cylinder head cover; drive system parts such as a bearing retainer, a gear tensioner, a head lamp actuator gear, an HVAC gear, a slide door roller, and clutch spherical components; brake system parts such as an air brake tube; on-vehicle electrical components such as an engine compartment wire harness connector, a motor part, a sensor, an ABS bobbin, a combination switch, an on-vehicle switch, and an electronic control unit (ECU) box; and interior and exterior parts such as slide door damper, a door mirror stay, a door mirror bracket, an inner mirror stay, a roof rail, an engine mount bracket, an air cleaner inlet pipe, a door checker, a plastic chain, an emblem, a clip, a breaker cover, a cup holder, an air bag, a fender, a spoiler, a radiator support, a radiator grill, a louver, an air scoop, hood bulge, a back door, a fuel sender module, a floor mat, an instrument panel, a dash board, a dash insulator, a rubber dam, a weather strip and a tire.

Also in a field of household appliances, the hydrogenated block copolymer and the resin composition are usable as bonding adhesives, pressure-sensitive adhesives, sealant materials, packings, O rings, belts and acoustic insulating materials in various electric appliances such as televisions, various recorders such as a blue ray recorder and a HDD recorder, as well as projectors, game machines, digital cameras, home videos, antennas, speakers, electronic dictionaries, IC recorders, FAX machines, copying machines, telephones, door phones, rice cookers, microwave ovens, ovens, refrigerators, dishwashers, dish driers, IH cooking heaters, hot plates, vacuum cleaners, washing machines, rechargers, sewing machines, clothes irons, driers, electric vehicles, air cleaners, water cleaners, electric toothbrushes, lighting equipment, air conditioners, air conditioner outdoor units, dehumidifiers, and humidifiers.

[Laminate]

The present invention also provides a laminate having an X layer that contains a hydrogenated block copolymer of the present invention, and a Y layer laminated on at least one surface of the X layer. The laminate of the present invention is excellent in vibration damping performance.

The laminate may be composed of one X layer and one Y layer, or may be composed of one X layer and two or more Y layers, or may be composed of two or more X layers and one Y layer, or may be composed of two or more X layers and two or more Y layers.

Though not specifically limited thereto, the configuration of the laminate of the present invention includes Y/X/Y, Y/X, and Y/X/Y/X/Y where "X" represents an X layer and "Y" represents a Y layer.

Plural Y layers may be formed of the same material or may be formed of different materials. Here, in the case where plural Y layers are formed of different materials and where the Y layers formed of different materials are referred to as "Y1", "Y2", "Y3" . . . , the configuration of the laminate of the present invention includes, though not specifically limited thereto, Y1/X/Y1, Y2/Y1/X/Y1/Y2, Y1/X/Y2, X/Y1/Y2, Y1/X/Y2/Y3, and Y1/X/Y2/X/Y3. Above all, laminates having a configuration of Y1/X/Y1, Y2/Y1/X/Y1/Y2 or Y1/X/Y2 are preferred; and laminates having a configuration of Y1/X/Y1 or Y2/Y1/X/Y1/Y2 are more preferred.

[X Layer]

The X layer is a layer containing the hydrogenated block copolymer of the present invention, and this may be a layer containing the hydrogenated block copolymer of the present invention alone, or may be a layer formed of a composition containing any other component than the hydrogenated block copolymer of the present invention.

For example, in the case where the layer X is used as an interlayer film for laminated glass, the layer X is a layer containing the hydrogenated block copolymer of the present invention, and may be a layer containing the hydrogenated block copolymer of the present invention alone, or may be a layer formed of a composition containing any other component than the hydrogenated block copolymer of the present invention. In the case where the layer X is used as an interlayer film for laminated glass, examples of the other component than the hydrogenated block copolymer of the present invention include an antioxidant, a UV absorbent, a light stabilizer, a heat shield and an antiblocking agent, but are not specifically limited thereto. One kind alone or two or more kinds of these may be used either singly or as combined.

Examples of the antioxidant include a phenolic antioxidant, a phosphorus-containing antioxidant, and a sulfur-containing antioxidant.

The UV absorbent includes a benzotriazole-base UV absorbent, a hindered amine-base UV absorbent and a benzoate-base UV absorbent, and in addition, a triazine compound, a benzophenone compound, a malonate compound and an oxalic acid anilide compound are also usable.

Examples of the light stabilizer include a hindered amine-base light stabilizer.

Examples of the heat shield include a material prepared by making a resin or glass contain heat ray-shielding particles having a heat ray-shielding function or an organic dye compound having a heat ray-shielding function. Examples of the particles having a heat ray-shielding function include particles of an oxide such as tin-doped indium oxide, antimony-doped tin oxide, aluminum-doped zinc oxide, tin-toped zinc oxide, or silicon-doped zinc oxide, and particles of an inorganic material having a heat ray-shielding function such as $LaB_6$ (lanthanum hexaboride) particles. Examples of the organic dye compound having a heat ray-shielding function include diimmonium dyes, aminium dyes, phthalocyanine dyes, anthraquinone dyes, polymethine dyes, benzenedithiol-type ammonium compounds, thiourea derivatives and thiol metal complexes.

The antiblocking agent includes inorganic particles and organic particles. The inorganic particles include particles of IA Group, IIA Group, IVA Group, VIA Group, VIIA Group, VIIIA Group, IB Group, IIB Group, IIIB Group or IVB Group element oxides, hydroxides, sulfides, nitrides, halides, carbonates, sulfates, acetates, phosphates, phosphites, organic carboxylates, silicates, titanates, or borates, and hydrated compounds thereof, as well as composite compounds having any of these as a center, and natural mineral particles. The organic particles include fluororesins, melamine resins, styrene-divinylbenzene copolymers, acrylic resin silicones and crosslinked derivatives thereof.

Also, for example, in the case where the X layer is used for an acoustic insulating material or a vibration damping material, especially for an acoustic insulating material or a vibration damping material for automobiles, the X layer is a layer containing the hydrogenated block copolymer of the present invention, and may be a layer containing the hydrogenated block copolymer of the present invention alone or may be a layer formed of a composition containing any other component than the hydrogenated block copolymer of the present invention. In the case where the layer X is used for an acoustic insulating material or a vibration damping material, especially for an acoustic insulating material or a vibration damping material for automobiles, examples the other component than the hydrogenated block copolymer of the present invention include an antioxidant, a UV absorbent, a light stabilizer, a heat shield, an antiblocking material, a pigment, a dye, a softening agent, a crosslinking material, a crosslinking aid, and a crosslinking accelerator, but are not specifically limited thereto. One kind alone or two or more kinds of these may be used either singly or as combined.

The antioxidant, the UV absorbent, the light stabilizer, the heat shield and the antiblocking material may be the same as those mentioned hereinabove in the case where the layer X is used as an interlayer film for laminated glass.

The pigment includes an organic pigment and an inorganic pigment. Examples of the organic pigment includes an azo pigment, a quinacridone pigment, and a phthalocyanine pigment. Examples of the inorganic pigment include titanium oxide, zinc oxide, zinc sulfide, carbon black, lead-base pigments, cadmium-base pigments, cobalt-base pigments, iron-base pigments, chromium-base pigments, ultramarine pigments and Prussian blue pigments.

Examples of the dye include azo-base, anthraquinone-base, phthalocyanine-base, quinacridone-base, perylene-base, dioxazine-base, anthraquinone-base, indolinone-base, isoindolinone-base, quinone-imine-base, triphenylmethane-base, thiazole-base, nitro-base, and nitroso-base dyes.

The softening agent may be any known softening agent, and examples thereof include paraffinic, naphthenic or aromatic hydrocarbon-base oils; vegetable oils such as peanut oil and rosin; phosphates; low-molecular-weight polyethylene glycols; liquid paraffin; low-molecular-weight polyethylene; hydrocarbon-base synthetic oils such as low-molecular polyethylene, ethylene-α-olefin copolymer oligomer, liquid polybutene, liquid polyisoprene or a hydrogenate thereof, and liquid polybutadiene or a hydrogenate thereof. One kind alone or two or more kinds of these may be used either singly or as combined.

Examples of the crosslinking agent include a radical generator, sulfur and a sulfur compound.

Examples of the radical generator include organic peroxides, for example, dialkyl monoperoxides such as dicumyl peroxide, di-t-butyl peroxide, and t-butylcumyl peroxide; diperoxides such as 2,5-dimethyl-2,5-di(t-butylperoxy)hexane, 2,5-dimethyl-2,5-di-(t-butylperoxy)hexyne-3, bis(t-butyldioxyisopropyl)benzene, 1,1-bis(t-butylperoxy)-3,3,5-trimethylcyclohexane, and n-butyl-4,4-bis(t-butylperoxy)valerate; dialkyl peroxides such as benzoyl peroxide, p-chlorobenzoyl peroxide, and 2,4-dichlorobenzoyl peroxide; monoacylalkyl peroxides such as t-butylperoxy benzoate; percarbonates such as t-butylperoxyisopropyl carbonate; diacyl peroxides such as diacetyl peroxide, and lauroyl peroxide. One kind alone or two or more kinds of these may be used either singly or as combined. Above all, 2,5-dimethyl-2,5-di(t-butylperoxy)hexane and dicumyl peroxide are preferred from the viewpoint of reactivity.

Examples of the sulfur compound include sulfur monochloride, and sulfur dichloride.

As the crosslinking agent, phenolic resins such as alkylphenol resins, and bromoalkylphenol resins; and a combination of p-quinone dioxime and lead dioxide, and a combination of p,p'-dibenzoylquinone dioxime and trilead tetroxide are also usable in addition to the above.

The crosslinking aid may be a known crosslinking aid, and examples thereof include monofunctional monomers such as trimethylolpropane trimethacrylate, trimethylolpropane triacrylate, triallyl trimellitate, triallyl 1,2,4-benzenetricarboxylate, triallyl isocyanurate, 1,6-hexanediol dimethacrylate, 1,9-nonanediol dimethacrylate, 1,10-decanediol dimethacrylate, polyethylene glycol dimethacrylate, ethylene glycol dimethacrylate, diethylene glycol dimethacrylate, triethylene glycol dimethacrylate, divinylbenzene, glycerol dimethacrylate, and 2-hydroxy-3-acryloyloxypropyl methacrylate; and stannous chloride, ferric chloride, organic sulfonic acids, polychloroprene, and chlorosulfonated polyethylene. One kind alone or two or more kinds of crosslinking aids may be used either singly or as combined.

Examples of the crosslinking accelerator include thiazoles such as N,N-diisopropyl-2-benzothiazole sulfenamide, 2-mercaptobenzothiazole, and 2-(4-morpholinodithio)benzothiazole; guanidines such as diphenylguanidine, and triphenylguanidine; aldehyde-amine reaction products or aldehyde-ammonia reaction products such as a butylaldehyde-aniline reaction product, and a hexamethylenetetramine-acetaldehyde reaction product; imidazolines such as 2-mercaptoimidazoline; thioureas such as thiocarbanilide, diethylurea, dibutylthiourea, trimethylthiourea, and di-orthotolylthiourea; dibenzothiazyl disulfide; thiuram monosulfides or thiuram polysulfides such as tetramethylthiuram monosulfide, tetramethylthiuram disulfide, pentamethylenethiuram tetrasulfide; thiocarbamates such as zinc dimethyldithiocarbamate, zinc ethylphenyldithiocarbamate, sodium dimethyldithiocarbamate, selenium dimethyldithiocarbamate, and tellurium diethyldithiocarbamate; xanthogenates such as zinc dibutylxanthogenate; and zinc oxide. One kind alone or two or more kinds of crosslinking accelerators may be used either singly or as combined.

The hydrogenated block copolymer of the present invention is not specifically limited in point of the use thereof, and within a range not detracting from the advantageous effects of the present invention, it may be mixed with any of an additive such as a crystal nucleating agent; a hydrogenate-base resin such as a hydrogenated chromane-indene resin, a hydrogenated rosin-base resin, a hydrogenated terpenes resin, and an alicyclic hydrogenated petroleum resin; a tackifying resin such as an aliphatic resin of an olefin or diolefin polymer; and any other polymer such as a hydrogenated polyisoprene, a hydrogenated polybutadiene, a butyl rubber, polyisobutylene, polybutene, a polyolefinic elastomer, concretely an ethylene-propylene copolymer, an ethylene-butylene copolymer, a propylene-butylene copolymer, a polyolefinic resin, an olefinic polymer, a polyethylenic resin, and an olefinic kinematic crosslinked thermoplastic elastomer (TPV).

Here, examples of the olefin that constitutes the polyolefinic resin include ethylene, propylene, 1-butene, 1-pentene, 1-hexene, 1-octene, 4-methyl-1-pentene, and cyclohexene. One kind alone or two or more kinds of olefins may constitute the polyolefinic resin either singly or as combined. In particular, examples of the polypropylenic resins that is a type of polyolefinic resin include a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. Also usable is a modified polypropylenic resin prepared by graft copolymerization of such a polypropylenic resin with a modifying agent such as an unsaturated monocarboxylic acid such as acrylic acid, methacrylic acid or crotonic acid; an unsaturated dicarboxylic acid such as maleic acid, citraconic acid or itaconic acid; an ester, an amide or an imide of such an unsaturated monocarboxylic acid or an unsaturated dicarboxylic acid; or an unsaturated dicarboxylic acid anhydride such as maleic anhydride, citraconic anhydride or itaconic anhydride.

The olefinic polymer is at least one olefinic polymer selected from an ethylene-propylene-diene copolymer (EPDM) rubber, an ethylene-vinyl acetate copolymer (EVA) and a polyethylene resin.

Dienes usable as a raw material for the ethylene-propylene-diene copolymer include a linear unconjugated diene such as 1,4-hexadiene, 1,6-octadiene, 2-methyl-1,5-hexadiene, 6-methyl-1,6-heptadiene, and 7-methyl-1,6-octadiene; a cyclic unconjugated diene such as cyclohexadiene, dichloropentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and a triene such as 2,3-diisopropylidene-5-norbornene, 2-ethylidene-3-isopropylidene-5-norbornene, 2-propenyl-2,2-norbornadiene, 1,3,7-octatriene, 1,4,9-decatriene.

Examples of the polyethylenic resin include a homopolymer of ethylene such as high-density polyethylene, middle-density polyethylene and low-density polyethylene; and an ethylene copolymer such as an ethylene/butene-1 copolymer, an ethylene/hexene copolymer, an ethylene/heptene copolymer, an ethylene/octene copolymer, an ethylene/4-methylpentene-1 copolymer, an ethylene/vinyl acetate copolymer, an ethylene/acrylic acid copolymer, an ethylene/acrylate copolymer, an ethylene/methacrylic acid copolymer, and an ethylene/methacrylate copolymer.

Not specifically limited in point of use, the hydrogenated block copolymer of the present invention may be mixed with any other polymer for use thereof, within a range not detracting from the advantageous effects of the present invention.

Examples of such polymers include polyphenylene ether resins; polyphenylene sulfide resins; polyacetal resins; polyamide resins such as polyamide 6 (nylon 6), polyamide 6.6, polyamide 6.10, polyamide 11, polyamide 12, polyamide 6.12, polyhexamethylenediamine terephthalamide, polyhexamethylenediamine isophthalamide, and xylene group-containing polyamides; polyester resins such as polyethylene terephthalate, and polybutylene terephthalate; acrylic resins such as polymethyl acrylate, and polymethyl methacrylate; polyoxymethylene resins such as polyoxymethylene homopolymers, and polyoxymethylene copolymers; styrenic resins such as styrene homopolymers, α-methylstyrene homopolymers, acrylonitrile-styrene resins, and acrylonitrile-butadiene-styrene resins; polycarbonate resins; ethylene-propylene copolymer rubbers (EPM); styrene-butadiene copolymer rubbers, styrene-isoprene copolymer rubbers or hydrogenates or modification products thereof, natural rubbers; synthetic isoprene rubbers, liquid polyisoprene rubbers and hydrogenates or modification products thereof; chloroprene rubbers; acryl rubbers; butyl rubbers; acrylonitrile-butadiene rubbers; epichlorohydrin rubbers; silicone rubbers; fluororubbers; chlorosulfonated polyethylenes; urethane rubbers, polyurethane elastomers; polyamide elastomers; styrenic elastomers; polyester elastomers; and soft polyvinyl chloride resins.

Further, not specifically limited in point of use, the hydrogenated block copolymer of the present invention may be mixed with various additives. Examples of such additives include an inorganic filler such as talc, clay, mica, calcium silicate, glass, glass hollow beads, glass fibers, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomaceous earth, alumina, titanium oxide, iron oxide, zinc oxide, magnesium oxide, tin oxide, antimony oxide, barium ferrite, strontium ferrite, carbon black, graphite, carbon fibers, active carbon, carbon hollow beads, calcium titanate, lead titanate zirconate, silicon carbide, and mica; an organic filler such as wood powder, and starch; and an organic pigment.

If desired, the hydrogenated block copolymer of the present invention may be mixed with any of a lubricant, an antistatic agent, a flame retardant, a foaming agent, a water repellent, a waterproofing agent, an electric conductivity imparting agent, a thermal conductivity imparting agent, an electromagnetic wave shielding performance imparting agent, a fluorescent agent and an antibacterial agent.

Also in the case of a rubber dam, a shoe sole material and a floor material, a resin composition containing any other material along with the hydrogenated block copolymer of the present invention may be used. Any known material usable in a rubber dam, a shoe sole material and a floor material may be contained in the composition with no specific limitation. For example, the composition may contain any of an olefinic polymer, a crosslinking agent, a crosslinking aid, a crosslinking accelerator, a foaming agent, a foaming aid, a processing aid, various resins and various additives.

The content of the additives in the resin composition containing the hydrogenated block copolymer is not specifically limited, and may be appropriately adjusted in accordance with the kind of the additive and the use of the resin composition. In the case where the resin composition contains the above-mentioned additive, the content of the additive may be, for example, 50% by mass or less, or 45% by mass or less, or 30% by mass or less, or 20% by mass or less, or 10% by mass or less, relative to the total amount, 100% by mass of the resin composition, and may be 0.01% by mass or more, or 0.1% by mass or more, or 1% by mass or more, or 5% by mass or more, or 10% by mass or more.

In the case where the X layer is a layer formed of a composition containing any other component than the hydrogenated block copolymer of the present invention, the content of the hydrogenated block copolymer of the present invention in the composition is, though not specifically limited thereto but from the viewpoint of vibration damping performance, preferably 50% by mass or more, more preferably 60% by mass or more, even more preferably 80% by mass or more, especially more preferably 90% by mass or more, and most preferably 95% by mass or more.

Also though not specifically limited, the thickness of the layer X is preferably 10 to 800 μm, more preferably 30 to 500 μm, even more preferably 50 to 500 μm, especially more preferably 70 to 350 μm. In particular, the layer X may be 50 to 150 μm, or may be 200 to 350 μm.

[Y Layer]

In the laminate of the present invention, though not specifically limited, the layer Y or at least one of the plural layers Y is preferably a glass layer. In this case, the layer X is an interlayer film for laminated glass. The thickness of the glass layer (in the case where the laminate has plural glass layers, the thickness of each one glass layer) is preferably 0.5 to 5 mm, more preferably 0.5 to 3.0 mm, even more preferably 1.0 to 2.5 mm, and especially more preferably 1.2 to 1.8 mm. When the thickness of the glass layer is 5 mm or less from the viewpoint of weight saving, it is thinner than previously planned, and therefore in the case, the acoustic insulating performance may naturally tend to lower, but the laminate using the hydrogenated block copolymer of the present invention can express sufficient acoustic insulating performance. When the thickness of the glass layer is 0.5 mm or more, sufficient acoustic insulating performance can be secured.

Glass for use in the glass layer is not specifically limited, and examples thereof include inorganic glass such as float sheet glass, polished sheet glass, figured glass, meshed sheet glass, and heat ray absorbing sheet glass, and known organic glass. Glass may be colorless, colored, transparent, semitransparent or nontransparent.

In the laminate of the present invention, at least one of the plural layers Y may be a layer containing a thermoplastic resin (i) different from the hydrogenated block copolymer of the present invention (primer layer or skin layer), and the thermoplastic resin (i) is preferably such that the shear storage modulus (G') thereof, as measured according to a complex shear viscosity test under the condition of a frequency of 1 Hz and at a temperature of 25° C. according to JIS K7244-10 (2005), is 10 MPa or more, more preferably 15 MPa or more, even more preferably 20 MPa or more, especially more preferably 20 to 70 MPa, and most preferably 35 to 55 MPa. In this case, the weather resistance and the strength of the X layer can be reinforced and the adhesiveness thereof to the glass layer can be adjusted.

In the case where at least one of the plural layers Y is a layer containing the thermoplastic resin (i) (primer layer or skin layer), the thickness of the layer X is, from the viewpoint of acoustic insulating performance, preferably 10% or more of the thickness of the primer layer, more preferably 20% or more, even more preferably 60% or more. Though not specifically limited, the upper limit is preferably 200% or less, more preferably 160% or less, even more preferably 130% or less.

The layer containing the thermoplastic resin (i) (primer layer or skin layer) may have a roughened surface.

Examples of the thermoplastic resin (i) include polyvinyl acetal resins, ionomers, ethylene-vinyl acetate copolymers, urethane resins, and polyamide resins. Above all, from the viewpoint of adhesiveness and transparency, polyvinyl acetal resins and ionomers are preferred.

(Polyvinyl Acetal Resin)

The polyvinyl acetal resin is a resin having a recurring unit represented by the following formula:

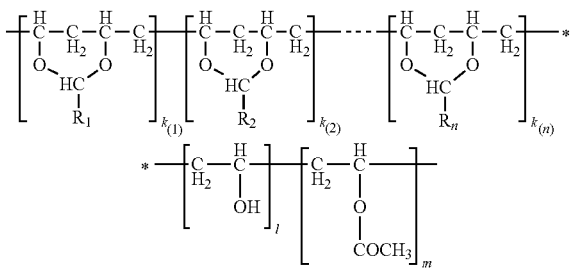

In the above formula, n represents a number of the kinds of aldehydes used in acetalization. $R_1$, $R_2$, ... $R_n$ each represent an alkyl residue of the aldehyde used in acetalization or a hydrogen atom, and $k_{(1)}$, $k_{(2)}$, ... $k_{(n)}$ each represent a ratio (by mol) of the structural unit represented by [ ]. l represents a ratio (by mol) of a vinyl alcohol unit, and m represents a ratio (by mol) of a vinyl acetate unit.

However, $k_{(1)}+k_{(2)}+ \ldots +k_{(n)}+l+m=1$, and any of $k_{(1)}$, $k_{(2)}$, ... $k_{(n)}$, l and m may be zero.

Each recurring unit is not specifically limited by the above-mentioned sequence, and may be arranged randomly or in a form of blocks, or may also be arranged in a tapered form.

A production method for the polyvinyl acetal resin is not specifically limited, and any known method, for example, the method described in WO2012/026501 can be employed.

As the polyvinyl acetal resin, any of polyvinyl acetal resins described in WO2012/026501 can be used, and above all, polyvinyl butyral (PVB) is preferred.

(Ionomer)

Not specifically limited, the ionomer may be a resin having an ethylene-derived structural unit, and a structural unit derived from an α,β-unsaturated carboxylic acid, in which at least a part of the α,β-unsaturated carboxylic acid is neutralized with a metal ion. The metal ion may be, for example, a sodium ion. In the ethylene-α,β-unsaturated carboxylic acid copolymer that is a base polymer, the content ratio of the structural unit of the α,β-unsaturated carboxylic acid is, though not specifically limited, preferably 2% by mass or more, more preferably 5% by mass or more. Also not specifically limited, the content ratio of the structural unit of the α,β-unsaturated carboxylic acid is preferably 30% by mass or less, more preferably 20% by mass or less.

Examples of the α,β-unsaturated carboxylic acid to constitute the ionomer include acrylic acid, methacrylic acid, maleic acid, monomethyl maleate, monoethyl maleate and maleic anhydride. Above all, acrylic acid and methacrylic acid are preferred.

In the present invention, from the viewpoint of easy availability, an ionomer of an ethylene-acrylic acid copolymer and an ionomer of an ethylene-methacrylic acid copolymer are preferred, and a sodium ionomer of an ethylene-acrylic acid copolymer and a sodium ionomer of an ethylene-methacrylic acid copolymer are more preferred.

In the case where the Y layer is a layer containing the above-mentioned thermoplastic resin (i), the layer may be a layer containing the thermoplastic resin (i) alone, or may be a layer formed of a composition containing any other component than the thermoplastic resin (i).

Examples of the other component than the thermoplastic resin (i) include, though not specifically limited thereto, an adhesion power controlling agent a plasticizer, an antioxidant, a UV absorbent, a light stabilizer, an antiblocking agent, a pigment, a dye, and a heat shield. One alone or two or more of these may be used either singly or as combined.

As the adhesion power controlling agent, those described in WO03/033583 can be used. Examples thereof include alkali metal salts, and alkaline metal salts. More specifically, there are mentioned potassium, sodium or magnesium salts. Examples of the salts include salts of an organic acid such as octanoic acid, hexanoic acid, butyric acid, acetic acid, or formic acid; and salts of an inorganic acid such as hydrochloric acid or nitric acid.

Also not specifically limited, examples of the plasticizer usable herein include carboxylate-base plasticizers such as monobasic carboxylates or polybasic carboxylates; phosphate-base plasticizers; phosphite-base plasticizers; polymer plasticizers such as polycarboxylates, polycarbonates, or polyalkylene glycols; esters of a hydroxycarboxylic acid and polyalcohol such as castor oil; and hydroxycarboxylate-base plasticizers such as esters of a hydroxycarboxylic acid and a monoalcohol.

The antioxidant, the UV absorbent, the light stabilizer, the antiblocking agent, the pigment, the dye and the heat shield may be the same as those to be in the layer X mentioned hereinabove.

In the case where the layer Y is a layer formed of a composition containing the thermoplastic resin (i), the content of the thermoplastic resin (i) in the composition is, though not specifically limited but from the viewpoint of adhesiveness, preferably 50% by mass or more, more preferably 60% by mass or more, even more preferably 80% by mass or more, especially more preferably 90% by mass or more, and most preferably 95% by mass or more.

A more specific and preferred embodiment of the laminate of the present invention is a laminate produced by laminating a glass layer/a layer containing a thermoplastic resin (i)/an X layer/a layer containing a thermoplastic resin (i)/a glass layer in that order [Y2/Y1/X/Y1/Y2]; and from the viewpoint of stiffness, a more preferred embodiment is a laminate produced by laminating a glass layer/an ionomer-containing layer/an X layer/an ionomer-containing layer/a glass layer in that order. From the viewpoint of controlling the adhesiveness to glass, an even more preferred embodiment is a laminate produced by laminating a glass layer/a PVB-containing layer/an X layer/a PVB-containing layer/a glass layer in that order.

A production method for the laminate of the present invention is not specifically limited, and examples thereof include a method of using a vacuum laminator, a method of using a vacuum bag, a method of using a vacuum ring, and a method of using a nip roll. For example, for producing a three-layer laminate of a layer containing a thermoplastic resin (i)/an X layer/a layer containing a thermoplastic resin (i) [Y1/X/Y1], a nip roll is preferably used. Also for example, for laminating a Y2 layer in a five-layer laminate of a glass layer/a layer containing a thermoplastic resin (i)/an X layer/a layer containing a thermoplastic resin (i)/a glass layer as laminated in that order [Y2/Y1/X/Y1/Y2], a vacuum laminator is preferably employed.

The conditions in using a nip roll are not specifically limited. A molded article produced through coextrusion at 180 to 230° C. or so using an extruder is sandwiched between two rolls such as mirror-finished metal rolls, and drawn up at a predetermined drawing speed. In the case of using a vacuum laminator, the hot plate temperature is preferably 140 to 190° C., the vacuuming time is preferably 6 to 20 minutes, the pressing pressure is preferably 35 to 65 MPa, and the pressing time is preferably 10 to 30 minutes.

Further, laminated glass of one embodiment of the present invention is described specifically. A production method for it is not specifically limited, and any conventionally-known method is employable. For example, the production method includes a method of using a vacuum laminator, a method of using a vacuum bag, a method of using a vacuum ring, and a method of using a nip roll. Also employable is a method of precompression followed by compression in an autoclave.

In the case of using a vacuum laminator apparatus, for example, the constituent layers can be laminated under a reduced pressure of $1 \times 10^{-6}$ to $3 \times 10^{-2}$ MPa at 100 to 200° C., especially 130 to 170° C. A method of using a vacuum bag or a vacuum ring is described, for example, in European Patent 1235683, and for example, the constituent layers can be laminated under a pressure of about $2 \times 10^{-2}$ MPa and at 130 to 145° C.

In the case of using a nip roll, for example, employable is a method where a first time precompression is carried out at a temperature not higher than the flow beginning temperature of a material of a primer layer such as an ionomer and a polyvinyl acetal resin, and then another precompression is further carried out under the condition near to the flow beginning temperature.

Though depending on the thickness and the constitution of a module, compression in an autoclave is preferably carried out, for example, under a pressure of about 1 to 15 MPa, at 130 to 155° C. for about 0.5 to 2 hours.

On both surfaces of an X layer, a glass sheet coated with a Y layer may be laminated in such a manner that an interlayer film for laminated glass of the present invention could be inside the resultant laminated glass, thereby preparing laminated glass.

One preferred use of the laminate excellent in acoustic insulating performance of the present invention is laminated glass as mentioned above. The laminated glass is, though not specifically limited thereto, effectively used, for example, for automobile front windshields, automobile side glass, automobile sun roofs, automobile rear windows, and glass for head-up displays.

EXAMPLES

Hereinunder the present invention is described in more detail with reference to Examples, but the present invention is not whatsoever restricted by these Examples.

Production methods for hydrogenated block copolymers used in Examples are shown below.

Production Example 1 Production of Hydrogenated Block Copolymer 59.6 kg of cyclohexane (solvent) dried with Molecular Sieves A4, and 0.04 kg of a cyclohexane solution of sec-butyl lithium having a concentration of 10% by mass as an anionic polymerization initiator (substantial amount added of sec-butyl lithium: 40 g) were put into a pressure-resistant container purged with nitrogen and dried.

The pressure-resistant container was heated up to 50° C., then 0.25 kg of styrene (1) was added and polymerized for 30 minutes, then cooled down to 40° C., and after 0.07 kg of 2,2-di(2-tetrahydrofuryl)propane [DTHFP] was added thereto, 12 kg of a mixture of isoprene and butadiene was added thereto, taking 5 hours, and polymerized for 1 hour. Subsequently, this was heated up to 50° C., 0.25 kg of styrene (2) was added and polymerized for 30 minutes, and then methanol was put thereinto to stop the reaction thereby giving a reaction liquid containing a polystyrene-poly(isoprene/butadiene)-polystyrene triblock copolymer.

The reaction liquid was heated up to 50° C., then pressurized up to a hydrogen pressure of 1 MPa, and thereafter a Ziegler catalyst (hydrogenation catalyst) formed of nickel octylate and trimethylaluminum was added in a hydrogen atmosphere, heated up to 80° C. by the reaction heat and reacted until presence of no hydrogen absorption. The reaction liquid was left cooled and depressurized, and after removal of the Ziegler catalyst by washing with water, this was dried in vacuum to give a polystyrene-poly(isoprene/butadiene)-polystyrene triblock copolymer hydrogenate (hereinafter this may be referred to as TPE-1).

The raw materials and the amount used thereof are summarized in Table 1.

Production Examples 2 to 3, Comparative Production Examples 1 to 4, and Reference Production Examples a to b Production of Hydrogenated Block Copolymers Hydrogenated block copolymers were produced in the same manner as in Production Example 1 except that the components and the amount used thereof as well as the hydrogenation catalyst were changed as in Table 1.

TABLE 1

Production of Hydrogenated Block Copolymers

|  |  | Production Example | | | Comparative Production Example | | | | Reference Production Example | |
|---|---|---|---|---|---|---|---|---|---|---|
|  |  | 1 | 2 | 3 | 1 | 2 | 3 | 4 | a | b |
| Hydrogenated Block Copolymer | | TPE-1 | TPE-2 | TPE-3 | TPE-1' | TPE-2' | TPE-3' | TPE-4' | TPE-a | TPE-b |
| Solvent | cyclohexane | 59.6 | 53.8 | 53.8 | 61.3 | 58.6 | 54.2 | 50 | 56.2 | 56.2 |
| Polymerization Catalyst | sec-butyl lithium (10 mass % cyclohexane solution) | 0.04 | 0.12 | 0.12 | 0.11 | 0.15 | 0.14 | 0.19 | 0.17 | 0.17 |
| (A) | styrene (1) | 0.25 | 1.02 | 1.02 | 0.92 | 1.97 | 1.72 | 2.5 | 1.68 | 1.68 |
|  | styrene (2) | 0.25 | 1.02 | 1.02 | 0.92 | 1.97 | 1.72 | 2.5 | 1.68 | 1.68 |
| (B)*1 | isoprene | 6.7 | 8.4 | 14.96 | 7.56 | 14.81 | 13.76 | 6.52 | 13.44 | 8.06 |
|  | butadiene | 5.3 | 6.6 |  | 5.94 |  |  | 5.13 |  | 5.38 |
| Lewis Base | tetrahydrofuran |  |  |  | 0.38 | 0.37 |  | 0 |  |  |
|  | TMEDA |  |  |  |  |  | 0.07 | 0 | 0.08 | 0.08 |
|  | DTHFP*2 | 0.07 | 0.04 | 0.04 |  |  |  | 0 |  |  |
| Hydrogenation Catalyst | Al/Ni-base Ziegler catalyst | ✓ | ✓ | ✓ | ✓ | ✓ | ✓ | ✓ |  |  |
|  | amount added of Al/Ni-base Ziegler catalyst*4 | 0.06 | 0.05 | 0.12 | 0.06 | 0.11 | 0.98 | 0.02 |  |  |
|  | palladium-carbon catalyse*3 |  |  |  |  |  |  |  | ✓ | ✓ |

Unless otherwise specifically noted, the unit of the amount used is kg.
*1: The components for the polymer block (B) were used as a mixture thereof.
*2: 2,2-di(2-tetrahydrofuryl)propane
*3: palladium amount carried, 5 mass %
✓: This shows the hydrogenation catalyst used.
*4: Molar number (mol %) of nickel octylate relative to the molar number of the double bond of the conjugated diene compound.

Examples 1 to 3, Comparative Examples 1 to 4, and Reference Examples a to b

The hydrogenated block copolymers obtained in Production Examples, Comparative Production Examples and Reference Production Examples were analyzed for evaluating the physical properties thereof according to the measurement methods described below. The results are shown in Table 2.

<Physical Properties of Hydrogenated Block Copolymers>

(i) Content of Polymer Block (A)

The hydrogenated block copolymer was dissolved in CDCl$_3$ and analyzed through $^1$H-NMR [apparatus: "ADVANCE 400 Nano Bay" (available from Bruker Corporation), measurement temperature: 30° C.), and the content of the polymer block (A) was calculated from the peak intensity derived from styrene.

(ii) Nucleus Hydrogenation Rate of Polymer Block (A)

The unhydrogenated block copolymer and the hydrogenated block copolymer corresponding to a hydrogenate thereof were separately dissolved in CDCl$_3$ and analyzed through $^1$H-NMR [apparatus: "ADVANCE 400 Nano Bay" (available from Bruker Corporation), measurement temperature: 30° C.). From the content of the aromatic vinyl compound in the unhydrogenated block copolymer and the content of the aromatic vinyl compound in the hydrogenated block copolymer, the nucleus hydrogenation rate was calculated.

(iii) Ratio of 1,4-Isoprene Chain Moiety in Polymer Block (B)

The hydrogenated block copolymer was dissolved in CDCl$_3$ and analyzed through 1H-NMR [apparatus: "ADVANCE 400 Nano Bay" (available from Bruker Corporation), measurement temperature: 30° C.). A ratio of the peak derived from the 1,4-bond-1,4-bond of isoprenes bonding together, relative to the total peak area was calculated, and this is referred to as a ratio of the moiety where an isoprene-derived structural units continue via a 1,4-bond (hereinunder this is referred to as a 1,4-isoprene chain moiety) to all the structural units in the polymer block (B). The ratio can be determined as a ratio of the peak area at a chemical shift value of 24 to 25 ppm to the peak area at a chemical shift value of 5 to 50 ppm, as measured according to $^{13}$C-NMR.

In Reference Examples, this measurement was omitted, and expressed as "-" in Table 2.

(iv) Vinyl Bond Amount in Polymer Block (B)

The unhydrogenated block copolymer was dissolved in CDCl$_3$ and analyzed through $^1$H-NMR [apparatus: "ADVANCE 400 Nano Bay" (available from Bruker Corporation), measurement temperature: 30° C.). From the ratio of the peak area corresponding to the 3,4-bond unit and the 1,2-bond unit in the isoprene structural unit and the 1,2-bond unit in the butadiene structural unit relative to the total peak area of the structural units derived from isoprene and/or butadiene, the vinyl bond amount (total content of the 3,4-bond unit and the 1,2-bond unit) was calculated.

(v) Hydrogenation Rate of Polymer Block (B)

The hydrogenated block copolymer was dissolved in CDCl$_3$ and analyzed through $^1$H-NMR [apparatus: "ADVANCE 400 Nano Bay" (available from Bruker Corporation), measurement temperature: 30° C.). From the ratio of the peak area derived from ethylene, propylene and butylene to the peak area derived from the residual olefin of isoprene or butadiene, the hydrogenation rate was calculated.

(vi) Morphology

The hydrogenated block copolymer was pressed at a temperature of 230° C. and under a pressure of 10 MPa for 3 minutes using a pressing apparatus "NF-50T" (available from Shinto Metal Industries Corporation) to give a film having a thickness of 1 mm. The film was cut into a desired size to be a test piece, and using a diamond cutter at a figuring temperature—110° C., this was figured. Using a scanning probe microscope (SPM-9700HT) (available from Shimadzu Corporation), the cross section (1 μm square) of the test piece was observed at a measurement temperature of 25° C. to evaluate the morphology thereof. In the case where the sample has a microphase-separated structure of any of a spherical one (FIG. 1), a cylindrical one (FIG. 2) or a lamellar one (FIG. 3), this is shown in Table 2.

(vii) Weight-Average Molecular Weight (Mw)

A polystyrene-equivalent weight-average molecular weight of the hydrogenated block copolymer was determined through gel permeation chromatography (GPC) under the conditions mentioned below.

(GPC Apparatus and Measurement Conditions)

Apparatus: GPC apparatus "HLC-8020" (available from Tosoh Corporation)
Separation columns: Two columns of "TSKgel G4000HX" (available from Tosoh Corporation) were connected in series.
Eluent: tetrahydrofuran
Eluent flow rate: 0.7 mL/min
Sample concentration: 5 mg/10 mL
Column temperature: 40° C.
Detector: differential refractive index (RI) detector
Calibration curve: Drawn using standard polystyrene.

(viii) Tan δ (Loss Tangent)

For the following measurement, a sheet having a thickness of 1.0 mm was prepared by pressing at a temperature of 230° C. under a pressure of 10 MPa for 3 minutes using a pressing apparatus "NF-50T" (available from Shinto Metal Industries Corporation), and the sheet was blanked to give a disc having a diameter of 8 mm to be a test piece.

As the measurement apparatus, a strain control dynamic viscoelastometer "ARES-G2" (available from TA Instruments Corporation) was used based on JIS K7244-10 (2005), and the disc was sandwiched between flat plates having a diameter of 8 mm and tested while vibrated at a strain of 0.1% and a frequency of 1 Hz and heated from −70° C. to 100° C. at 3° C./min.

In the above test, a maximum width of a continuing temperature range in which tan δ could be 1.0 or more, a maximum width of a continuing temperature range in which tan δ could be 1.5 or more, a maximum peak intensity at tan δ, and a peak top temperature. A graph of tan δ obtained in Examples 1 to 3 and Comparative Examples 1 to 3 is shown in FIGS. 4 to 9, respectively.

In Reference Examples, this measurement was omitted, and expressed as "-" in Table 2.

(ix) Block Ratio of Polymer Block (A)

The hydrogenated block copolymer was dissolved in CDCl$_3$, and analyzed through $^1$H-NMR [apparatus: "ADVANCE 400 Nano Bay" (available from Bruker Corporation), measurement temperature: 30° C.]. In the peaks observed within a range of 6.0 ppm to 7.5 ppm, a ratio of the peak area on the higher magnetic field side than 6.6 ppm to the peak area on the lower magnetic field side was calculated to give the block ratio of the polymer block (A).

In Reference Examples, this measurement was omitted, and expressed as "-" in Table 2.

(x) 2,2-Di(2-Tetrahydrofuryl) Propane Residual Amount (DTHFP Residual Amount)

The hydrogenated block copolymer was dissolved in CDCl$_3$, and analyzed through $^1$H-NMR under the condition mentioned below to determine the DTHFP residual amount.

In Comparative Examples and Reference Examples not using DTHFP, this measurement was omitted, and expressed as "-" in Table 2.

($^1$H-NMR Measurement Condition)

The hydrogenated block copolymer was dissolved in CDCl$_3$, and analyzed through $^1$H-NMR [apparatus: "ADVANCE 400 Nano Bay" (available from Bruker Corporation), measurement temperature: 30° C.]. From a ratio of the peak area derived from DTHFP and the peak area derived from styrene, the DTHFP amount was calculated.

TABLE 2

| | | Example | | | Comparative Example | | | | Reference Example | |
|---|---|---|---|---|---|---|---|---|---|---|
| | | 1 | 2 | 3 | 1 | 2 | 3 | 4 | a | b |
| | Hydrogenated Block Copolymer Used | TPE-1 | TPE-2 | TPE-3 | TPE-1' | TPE-2' | TPE-3' | TPE-4' | TPE-a | TPE-b |
| Physical Properties of Hydrogenated Copolymer | Structural unit of polymer block (A) | St | St | St | St | St | St | St | St | St |
| | Content of polymer block (A) (mass %) - Requirement (1) | 4 | 12 | 12 | 12 | 21 | 20 | 20 | 20 | 20 |
| | Nucleus hydrogenation rate of polymer block (A) (mol %) - Requirement (8) | 3 | 2 | 2 | 2 | 2 | 10 | 2 | 10 | 11 |
| | Components constituting polymer block (B) - Requirement (2) | Ip/Bd | Ip/Bd | Ip | Ip/Bd | Ip | Ip | Ip/Bd | Ip | Ip/Bd |
| | Mass ratio of components constituting polymer block (B) | 56/44 | 56/44 | 100 | 56/44 | 100 | 100 | 56/44 | 100 | 60/40 |
| | Molar ratio of components constituting polymer block (B) | 50/50 | 50/50 | 100 | 50/50 | 100 | 100 | 50/50 | 100 | 54/46 |
| | Ratio of 1,4-isoprene chain moiety in polymer block (B) | 0.8 | 0.2 | 1.4 | 0.4 | 1.8 | 1.5 | 10 | 1.5 | 1.0 |
| | Vinyl bond amount in polymer block (B) (mol %) - Requirement (3) | 87 | 83 | 83 | 60 | 60 | 73 | 7 | 82 | 88 |
| | Hydrogenation rate of polymer block (B) (mol %) - Requirement (4) | 95 | 95 | 86 | 90 | 90 | 85 | 99 | 83 | 86 |
| | Polymer structure | A/B/A | A/B/A | A/B/A | A/B/A | A/B/A | A/B/A | A/B/A | A/B/A | A/B/A |
| | Morphology of hydrogenated block copolymer | spherical | spherical | spherical | spherical | spherical | cylindrical | cylindrical | cylindrical | cylindrical |
| | Weight-average molecular weight of hydrogenated block copolymer | 240,000 | 122,000 | 121,000 | 150,000 | 93,000 | 121,000 | 110,000 | 105,000 | 106,000 |
| | Maximum width in temperature range where tanδ ≥ 1 (° C.) - Requirement (5) | 19.1 | 18.3 | 20.7 | 14.6 | 15.0 | 15.2 | *5 | 14.2 | 14.4 |
| | Maximum width in temperature range where tanδ ≥ 1.5 (° C.) - Requirement (6) | 10.5 | 10.2 | 11.9 | 8.0 | 7.1 | 5.3 | *5 | 4.5 | 4.3 |

TABLE 2-continued

|  | Example | | | Comparative Example | | | | Reference Example | |
|---|---|---|---|---|---|---|---|---|---|
|  | 1 | 2 | 3 | 1 | 2 | 3 | 4 | a | b |
| Hydrogenated Block Copolymer Used | TPE-1 | TPE-2 | TPE-3 | TPE-1' | TPE-2' | TPE-3' | TPE-4' | TPE-a | TPE-b |
| Maximum peak intensity at tanδ - Requirement (7) | 2.0 | 2.2 | 2.2 | 2.2 | 2.2 | 1.6 | 0.55 | 1.4 | 1.4 |
| Peak top temperature at tanδ (° C.) | 8.0 | 14.7 | 33.8 | −21.0 | −4.5 | 22.4 | −49.1 | 28.2 | 15.3 |
| Block ratio in polymer (A) (%) - Requirement (9) | 68 | 80 | 84 | 86 | 90 | 65 | 95 | 60 | 63 |
| DTHFP residual amount (ppm) | 126 | 183 | 232 | — | — | — | — | — | — |

*5: Not measured since tanδ did not satisfy the requirement of 1 or more.

<Description of Abbreviations in Table 2>
St: styrene
Bd: butadiene
Ip: isoprene The hydrogenated block copolymers of Examples can be said to have a broad maximum width in a continuing temperature range where tan δ is 1.0 or more and can be said to be excellent in vibration damping performance in a broad temperature range. In addition, the maximum width in a continuing temperature range where tan δ is 1.5 or more is 10° C. or more and is also broad, which also indicates excellent vibration damping performance of these hydrogenated block copolymers. Among Examples 1 to 3, the maximum width is the broadest in Example 3, and this may be considered to be because the isoprene ratio in the polymer block (B) is high in Example 3 as compared with that in Examples 1 and 2.

On the other hand, the hydrogenated block copolymers of Comparative Examples 1 and 2 has a narrow maximum width in a continuing temperature range where tan δ is 1.0 or more, and one reason for this may be considered to be because the vinyl bond amount in these is relatively small.

In Comparative Example 3, the vinyl bond amount is higher than in Comparative Example 2 by 13%, but in this, the maximum width in a continuing temperature range where tan δ is 1.0 or more is 15.2° C. and the result is almost the same as in Comparative Example 2. In addition, in Comparative Example 3, the maximum peak intensity at tan δ is low, and in particular, the maximum width in a continuing temperature range where tan δ is 1.5 or more is 5.3° C., and the result is narrower than in Examples. One reason for these results is considered to be because, in the production process for the block copolymer TPE-3' used in Comparative Example 3, TMEDA is used as a vinylating agent, and therefore, for the purpose of increasing the hydrogenation rate, a larger amount of the the hydrogenation catalyst needs to be used. In that manner in Comparative Example 3, a large amount of the hydrogenation catalyst is used therefore resulting in that the nucleus hydrogenation rate is high and the block ratio is low. As opposed to this, in Example 3, the hydrogenation rate is on the same level as in Comparative Example 3, but the nucleus hydrogenation rate therein is suppressed low as compared with that in Comparative Example 3, therefore resulting in that the block ratio is high. This is because, in Example 3, DTHFP is used as a vinylating agent, and therefore both a high vinyl bond amount and a high hydrogenation rate can be satisfied even under mild conditions not using a large amount of the hydrogenation catalyst.

From the results, it is presumed that, for broadening the width of a continuing temperature range where tan δ is 1.0 or more, it is important to increase the vinyl bond amount and to carry out the hydrogenation reaction under mild conditions.

In the hydrogenated block copolymers of Comparative Example 3 and Reference Examples a and b, nucleus hydrogenation of styrene proceeded too much to secure presumed mechanical properties.

Examples 4 to 6 and Comparative Examples 5 to 7

Using a twin-screw extruder ("ZSK26Mc" available from Coperion Corporation) under the conditions of a cylinder temperature of 200° C. and a screw revolution number of 300 rpm and according to the formulation shown in Table 3, the hydrogenated block copolymer (TPE-1 to TPE-3), (TPE-1' to TPE-3') and a resin mentioned below were fed into the extruder and melt-kneaded therein to give a resin composition.

The resultant resin composition was analyzed for evaluating the physical properties thereof according to the measurement methods mentioned below. The results are shown in Table 3.

(Resin)
Polypropylene-1: "Prime Polypro F327" (MFR [230° C., load 2.16 kg (21 N)]=7 g/10 min, available from Primer Polymer Corporation)

<Physical Properties of Resin Composition>
(Loss Factor)

The resin composition obtained in Examples and Comparative Examples was injection-molded using an injection molding machine ("EC75SX", available from Toshiba Machine Co., Ltd.) to prepare a sheet having a size of length 200 mm×width 40 mm×thickness 2 mm. The sheet was blanked into a sample having a size of length 200 mm×width 10 mm×thickness 2 mm.

Next, the sample was set in a loss factor measuring system (complex modulus of elasticity measuring apparatus ME3930, available from Bruel & Kjar A/S; electromagnetic vibration exciter MM0002; impedance box MH9123-D). Specifically, one end of the sample was fixed on the top of the complex modulus of elasticity measuring apparatus. With that, the sample was tested in a damping test according to a cantilever vibration method where the other end of the sample was vibrated within a range of a frequency of 0 to 8,000 Hz, and the excitation force and the acceleration signal to express an acceleration wave form at that end were detected. For each sample, the test was carried out at a temperature of 20° C. and 40° C.

The resultant data of the excitation force and the acceleration signal were integrated to give a speed signal, and based on this, the mechanical impedance at the excitation point (center part of the sample vibrated) was determined.

With that, an impedance curve was drawn on a graph where the horizontal axis indicates the frequency and the vertical axis indicates the mechanical impedance, and from the full width at half maximum of the second peak (2nd mode) counted from the low frequency side, the loss factor of each sample at each temperature was determined.

A sample having a larger value of loss factor has a higher vibration damping effect.

TABLE 3

|  |  | Example | | | Comparative Example | | |
|---|---|---|---|---|---|---|---|
|  |  | 4 | 5 | 6 | 5 | 6 | 7 |
| Polypropylene-1 | part | 90 | 90 | 90 | 90 | 90 | 90 |
| TPE-1 | by | 10 |  |  |  |  |  |
| TPE-2 | mass |  | 10 |  |  |  |  |
| TPE-3 |  |  |  | 10 |  |  |  |
| TPE-1' |  |  |  |  | 10 |  |  |
| TPE-2' |  |  |  |  |  | 10 |  |
| TPE-3' |  |  |  |  |  |  | 10 |
| Loss Factor | 20° C. | 0.140 | 0.138 | 0.092 | 0.105 | 0.107 | 0.073 |
|  | 40° C. | 0.088 | 0.083 | 0.107 | 0.065 | 0.064 | 0.076 |

It can be said that the resin compositions of Examples 4 to 6 have a large loss factor and are excellent in vibration damping performance. In particular, the samples of Examples 4 to 6 have a loss factor of 0.080 or more at 40° C., and it is known that the resin compositions of the present invention has a high-level vibration damping performance in a broad temperature range.

The resin composition of Example 4 contains a hydrogenate having a relatively small styrene content, and the result is that the loss factor thereof is a relatively high value. In Examples 5 and 6 and Comparative Example 5, the hydrogenates contained in the resin compositions have a styrene content on nearly the same level, but the hydrogenates in Examples 5 and 6 have a high vinyl bond amount and therefore have a high loss factor especially at 40° C. Further, the vinyl bond amount in the hydrogenate contained in the resin composition of Comparative Example 6 is relatively small, and the block ratio of the hydrogenate contained in the resin composition of Comparative Example 7 is relatively low, and therefore the result is that the loss factor at 40° C. in these Comparative Examples 6 and 7 is a low value as compared with that in Examples 4 to 6.

Examples 7 and 8, Comparative Example 8, Reference Example c

In the same manner as in Example 4 but according to the formulation shown in Table 4, resin compositions were produced.

The resultant resin compositions were analyzed to evaluate the physical properties thereof according to the measurement methods mentioned below. For reference, polypropylene-2 alone was analyzed to show the data thereof as Reference Example.
(Resin)
Polypropylene-2: "Hydro-G PP-HP12" (homopolypropylene, MFR [230° C., load 2.16 kg (21 N) catalog value]=12 g/10 min, available from Entec Polymers Corporation)
<Physical Properties of Resin Composition>
(Tan δ (Tension, 10 Hz))

The resin compositions were measured according to JIS K 7244-4 (1999). Specifically, the resultant resin composition was injection-molded using an injection molding machine ("EC75SX", available from Toshiba Machine Co., Ltd.) to prepare a sheet having a size of length 50 mm×width 30 mm×thickness 1 mm. The sheet was blanked into a sample having a size of length 30 mm×width 5 mm×thickness 1 mm. Using a dynamic viscoelastometer available from Hitachi High-Technologies Corporation, the sample was analyzed at a measurement temperature of −80° C. to 100° C. and a frequency of 10 Hz to determine the tan δ intensity thereof at 0° C., 20° C. and 40° C.

(Tensile Characteristics)

The resin compositions were measured according to JIS K 7161 (2014). Specifically, the resultant resin composition was injection-molded to prepare JIS versatile test pieces A1. Using an all-purpose material tester Model 5566 available from Instron Corporation, the test pieces were analyzed to measure the tensile strength [MPa], the tensile elongation at break [%] and the tensile elastic modulus [MPa] thereof.
(Hardness (Shore A))

The resultant resin composition was formed into test pieces for hardness measurement having a size of 30 mm×25 mm×thickness 5 mm, and according to JIS K 6253 (2012), these were tested in a durometer hardness test using a durometer hardness meter type A, GS-619R-G (available from Teclock Co., Ltd.) to measure the Shore A hardness thereof.
(MFR (230° C., 2.16 kg))

MFR was measured according to JIS K 7210 (2014).

TABLE 4

|  |  | Reference Example c | Example 7 | Example 8 | Comparative Example 8 |
|---|---|---|---|---|---|
| Polypropylene-2 | part by | 100 | 90 | 90 | 90 |
| TPE-2 | mass |  | 10 |  |  |
| TPE-3 |  |  |  | 10 |  |
| TPE-4' |  |  |  |  | 10 |
| tanδ | 0° C. | 0.17 | 0.28 | 0.20 | 0.16 |
| (tension, 10 Hz) | 20° C. | 0.14 | 0.52 | 0.41 | 0.14 |
|  | 40° C. | 0.14 | 0.29 | 0.43 | 0.15 |
| Tensile strength [MPa] |  | 31.5 | 29.5 | 29.0 | 27.0 |
| Tensile elongation at break [%] |  | 99 | 108 | 115 | 75 |
| Tensile elastic modulus [MPa] |  | 806 | 905 | 935 | 767 |
| Hardness (Shore A) |  | 94.8 | 95.0 | 96.0 | 95.8 |
| MFR (230° C., 2.16 kg) |  | 11.3 | 10.3 | 10.9 | 8.0 |

As shown in Table 4, the resin compositions of Examples 7 and 8 have a higher tensile elongation at break, a higher tensile elastic modulus and a higher hardness than the resin composition of Comparative Example 8 and the sample of Reference Example c, and have a higher tensile strength and a larger MFR value than the resin composition of Comparative Example 8. Further, in addition to having excellent mechanical properties, the resin compositions of Examples 7 and 8 have a larger value of tan δ in a temperature range of 0° C. to 40° C. as compared with the resin composition of Comparative Example 8 and the sample of Reference Example c, and it is known that the resin compositions of these Examples show a high vibration damping performance in a broad temperature range from a low temperature to a relatively high temperature.

Examples 9 to 11, Comparative Example 9

In the same manner as in Example 4 but according to the formulation shown in Table 5, resin compositions (pressure-sensitive or bonding adhesive materials) were produced.

The resultant resin compositions were analyzed according to the measurement methods mentioned below to evaluate the physical properties thereof.
(Tackifying Resin)
"Alcon P-125", available from Arakawa Chemical Industries, Ltd.
(Plasticizer)
"Diana Process Oil PW-32", hydrogenated paraffinic oil, kinematic viscosity at 40° C.: 31 mm$^2$/s, available from Idemitsu Kosan Co., Ltd.
<Physical Properties of Resin Composition>
(Tan δ (Shear, 1 Hz))

The resin compositions were measured according to JIS K 7244-10 (2005). Specifically, the resultant resin composition was injection-molded using an injection molding machine ("EC75SX", available from Toshiba Machine Co., Ltd.) to prepare a sheet having a size of length 50 mm×width 30 mm×thickness 1 mm. The sheet was blanked into a disc having a diameter of 8 mm to be a sample.

Using a strain control dynamic viscoelastometer "ARES-G2" (available from TA Instruments Corporation), the sample was sandwiched between flat plates having a diameter of 8 mm and tested while vibrated at a strain of 0.1% and a frequency of 1 Hz and heated from −70° C. to 100° C. at 3° C./min to determine the tan δ intensity thereof at 0° C., 20° C. and 40° C.
(40° C. Peel Strength)

A SUS plate having a size of length 75 mm×width 25 mm×thickness 1 mm, a sheet of the resultant resin composition and a polyethylene sheet having a thickness of 50 μm were laminated in that order and arranged at the center of a metal spacer having an outer dimension of 200 mm×200 mm, an inner dimension of 150 mm×150 mm and a thickness of 2 mm. The overlaid sheet and the metal spacer were sandwiched between polytetrafluoroethylene sheets, further sandwiched from the outside between metal plates, and compression-molded under a temperature condition of 160° C. and under a load of 20 kgf/cm$^2$ for 3 minutes, using a compression molding machine, to thereby prepare a laminate of PET/block copolymer composition/SUS plate.

Using "Instron 5566" available from Instron Corporation and according to JIS K 6854-2 (1999), the laminate was tested according to a peel strength test under the conditions of a contact angle of 180° and a tensile speed of 100 mm/min and at 40° C. to determine the adhesion strength (peel strength) thereof.

TABLE 5

|  |  | Example 9 | Example 10 | Example 11 | Comparative Example 9 |
|---|---|---|---|---|---|
| TPE-2 | part by mass | 40 |  |  |  |
| TPE-3 |  |  | 40 | 70 |  |
| TPE-4' |  |  |  |  | 40 |
| Tackifying resin |  | 40 | 40 | 10 | 40 |
| Plasticizer |  | 20 | 20 | 20 | 20 |
| tan δ | 0° C. | 0.80 | 0.30 | 0.50 | 0.04 |
| (shear, 1 Hz) | 20° C. | 2.50 | 2.00 | 1.80 | 0.02 |
|  | 40° C. | 0.70 | 2.00 | 0.80 | 0.03 |
| 40° C. peel strength to SUS, N/25 mm |  | 18 | 25 | 8 | 6 |

As in Table 5, the resin compositions of Examples 9 to 11 have a higher tan δ at 0° C. to 40° C. than the resin composition of Comparative Example 9, and are excellent in peel strength at 40° C. Accordingly, the resin compositions of Examples 9 to 11 can be favorably used as bonding or pressure-sensitive adhesives capable of expressing vibration damping performance in a wide temperature range.

Examples 12 to 15, Comparative Example 10

In the same manner as in Example 4 but according to the formulation shown in Table 6, resin compositions (oil gels) were produced.

The resultant resin compositions were analyzed according to the measurement methods mentioned below to evaluate the physical properties thereof.
(Plasticizer)
"Diana Process Oil PW-32", hydrogenated paraffinic oil, kinematic viscosity at 40° C.: 31 mm$^2$/s, available from Idemitsu Kosan Co., Ltd.
<Physical Properties of Resin Composition>
(Tan δ (Shear, 1 Hz))

The resin compositions were measured according to the same method as that for "tan δ (shear, 1 Hz)" shown in Table 5.

TABLE 6

|  |  | Example 12 | Example 13 | Example 14 | Example 15 | Comparative Example 10 |
|---|---|---|---|---|---|---|
| TPE-2 | part by mass | 90 |  |  |  |  |
| TPE-3 |  |  | 90 | 80 | 70 |  |
| TPE-4' |  |  |  |  |  | 90 |
| Plasticizer |  | 10 | 10 | 20 | 30 | 10 |
| tan δ | 0° C. | 0.30 | 0.10 | 0.50 | 1.10 | 0.04 |
| (shear, 1 Hz) | 20° C. | 1.60 | 2.20 | 1.80 | 1.40 | 0.03 |
|  | 40° C. | 0.40 | 0.70 | 0.40 | 0.20 | 0.04 |

From Table 6, it is known that the resin compositions of Examples 12 to 15 have a higher tan δ at 0° C. to 40° C. than the resin composition of Comparative Example 10, and are excellent in vibration clamping performance and shock absorbability. Accordingly, the resin compositions of Examples 12 to 15 are suitable for shoe sole cushion materials and the like.

Examples 16 to 18, Comparative Example 11, Reference Example d

In the same manner as in Example 4 but according to the formulation shown in Table 7, resin compositions (glass fibers-reinforced polypropylene compositions) were produced. Glass fibers were side-fed at the middle of the extruder.

The resultant resin compositions were analyzed according to the measurement methods mentioned below to evaluate the physical properties thereof. For reference, measured data of a case not containing a hydrogenated block copolymer are shown in the Table as Reference Example d.
(Resin)
Polypropylene-3: "Prime Polypro J705UG", block polypropylene, available from Prime Polymer Co., Ltd.
Polypropylene-4: "Admer QE840" available from Mitsui Chemicals, Inc.
(Glass Fibers)
"T-480", chopped strands, available from Nippon Electric Glass Co., Ltd.
<Physical Properties of Resin Composition>
(Loss Factor)

The resultant resin composition was injection-molded using an injection molding machine ("EC75SX", available from Toshiba Machine Co., Ltd.) to prepare a sheet having a size of length 200 mm×width 40 mm×thickness 2 mm. The sheet was blanked into a size of length 200 mm×width 10 mm×thickness 2 mm, and a contact chip was stuck to the center part thereof using an adhesive having a main component of α-cyanoacrylate to prepare a sample.

Next, the sample was set in a loss factor measuring system (available from Bruel & Kjar A/S, vibration exciter Model 4809; impedance head 80001 Model).

At the tip of the excitation force detector built in the impedance head, the contact chip stuck to the center part of the sample was fixed. Vibration was given to the center part of the laminate within a frequency range of 0 to 8,000 Hz, and at the point, the excitation force and the acceleration wave form were detected in a damping test according to a center shaking method, in which the excitation force and the acceleration signal to express the acceleration wave form at the center part were detected. For each sample, the measurement test was carried out at a temperature of 0° C., 20° C., 40° C., 60° C., 80° C. and 100° C.

Based on the speed signal determined by integrating the resultant data of the excitation force and the acceleration signal, the mechanical impedance at the excitation point (center part of the sample vibrated) was determined. With that, an impedance curve was drawn on a graph where the horizontal axis indicates the frequency and the vertical axis indicates the mechanical impedance, and from the full width at half maximum of the second peak (2nd mode) counted from the low frequency side, the loss factor of each sample at each temperature was determined.

A sample having a larger value of loss factor has a higher vibration damping effect.
(Tensile Characteristics)

According to the same methods as the measurement methods for tensile characteristics shown in Table 4, the tensile strength [MPa] and the tensile elongation at break [%] were determined.
(Bending Characteristics)

The resultant resin composition was injection-molded using an injection molding machine ("EC75SX", available from Toshiba Machine Co., Ltd.) to prepare a JIS versatile test piece A1, and the center part (80×10×t4 mm) thereof was used here. Based on JIS K 7171 (2016) and using a universal tester (5566 Model, available from Instron Corporation), the sample was tested in a bending strength test to measure the bending strength [MPa] and the bending elastic modulus [MPa]

TABLE 7

|  |  | Reference Example d | Example 16 | Example 17 | Example 18 | Comparative Example 11 |
|---|---|---|---|---|---|---|
| Polypropylene-3 | part | 68 | 58 | 63 | 58 | 58 |
| Polypropylene-4 | by | 2 | 2 | 2 | 2 | 2 |
| Glass fibers | mass | 30 | 30 | 30 | 30 | 30 |
| TPE-2 |  |  | 10 |  |  |  |
| TPE-3 |  |  |  | 5 | 10 |  |
| TPE-4' |  |  |  |  |  | 10 |
| Loss factor (0° C.) |  | 0.029 | 0.042 | 0.024 | 0.021 | 0.029 |
| Loss factor (20° C.) |  | 0.036 | 0.073 | 0.035 | 0.037 | 0.032 |
| Loss factor (40° C.) |  | 0.026 | 0.050 | 0.059 | 0.066 | 0.028 |
| Loss factor (60° C.) |  | 0.029 | 0.036 | 0.034 | 0.046 | 0.023 |
| Loss factor (80° C.) |  | 0.022 | 0.032 | 0.028 | 0.035 | 0.025 |
| Loss factor (100° C.) |  | 0.026 | 0.033 | 0.030 | 0.035 | 0.031 |
| Tensile strength [MPa] |  | 74 | 63.5 | 70.3 | 68.8 | 61.6 |
| Tensile elongation at break [%] |  | 2 | 3 | 1.9 | 2.5 | 3.1 |
| Bending strength [MPa] |  | 117.8 | 101.5 | 111.6 | 105.9 | 95.5 |
| Bending elastic modulus [MPa] |  | 6390 | 5330 | 5888 | 5490 | 5260 |

As in Table 7, the resin compositions of Examples 16 to 18 have the same as or a larger tensile elongation at break than the resin composition of Reference Example d not containing a block copolymer, and have larger values of tensile strength, bending strength and bending elastic modulus than the resin composition of Comparative Example 11. In addition, the resin compositions of Examples 16 to 18 have a large value of loss factor in a broad temperature range of 40° C. to 80° C. and are known to exhibit a high vibration damping performance in a broad temperature range. In particular, the resin composition of Example 16 has a larger value of loss factor even at 0° C. to 20° C. than the resin compositions of Comparative Example 11 and Reference Example d, and is known to exhibit a high vibration damping performance even at low temperatures.

Examples 19 and 20, Comparative Example 12, Reference Example e

In the same manner as in Example 4 but according to the formulation shown in Table 8, resin compositions were produced.

The resultant resin compositions were analyzed according to the measurement methods mentioned below to evaluate the physical properties thereof. For reference, measured data of a case of polyethylene alone are shown in the Table as Reference Example e.
(Resin)
Polyethylene: "Hypel PEHD 8" (high-density polyethylene, MFR [190° C., load 2.16 kg (21 N) catalog value]=6.6/10 min, available from Entec Polymers Corporation)
<Physical Properties of Resin Composition>
(Tan δ (Tension, 10 Hz))
This was measured according to the same method as that for "tan δ (tension, 10 Hz)" shown in Table 4.
(Tensile Characteristics)
These was measured according to the same methods as those for the measurement method for tensile characteristics shown in Table 4 to determine the tensile strength [MPa] and the tensile elongation at break [%] thereof.
(Hardness (Shore A))
This was measured according to the same method as that for "hardness (Shore A)" shown in Table 4.
(MFR (190° C., 2.16 kg))
This was measured according to JIS K 7210 (2014).

TABLE 8

|  |  | Reference Example e | Example 19 | Example 20 | Comparative Example 12 |
|---|---|---|---|---|---|
| Polyethylene | part by mass | 100 | 90 | 90 | 90 |
| TPE-2 |  |  | 10 |  |  |
| TPE-3 |  |  |  | 10 |  |
| TPE-4' |  |  |  |  | 10 |
| tan δ (tension, 10 Hz) | 0° C. | 0.17 | 0.28 | 0.20 | 0.16 |
|  | 20° C. | 0.14 | 0.52 | 0.41 | 0.14 |
|  | 40° C. | 0.14 | 0.29 | 0.43 | 0.15 |
| Tensile strength [MPa] |  | 19.8 | 23.0 | 23.2 | 22.8 |
| Tensile elongation at break [%] |  | 222 | 870 | 878 | 784 |
| Hardness (Shore A) |  | 96 | 96 | 96 | 95 |
| MFR (190° C., 2.16 kg) |  | 6.6 | 6.1 | 5.9 | 4.5 |

As in Table 8, the resin compositions of Examples 19 and 20 have a larger tensile strength and a larger tensile elongation at break than the resin composition of Comparative Example 12 and the sample of Reference Example e, and in addition, these have a larger value of MFR than the resin composition of Comparative Example 12. Moreover, the resin compositions of Examples 19 and 20 have a larger value of tan δ in a temperature range of 0° C. to 40° C. than the samples of Comparative Example 12 and Reference Example e, and are known to exhibit high vibration damping performance in a broad temperature range from a low temperature to a relatively high temperature.

Examples 21 to 23, Comparative Example 13, Reference Example f

Using a kneader, an ethylene-propylene-diene copolymer (EPDM), an ethylene-vinyl acetate copolymer (EVA), a hydrogenated block copolymer, fillers 1 and 2 and a plasticizer were melt-mixed at a temperature of 120° C. in a ratio according to the formulation shown in Table 9 to prepare a master batch.

Next, a crosslinking agent and a foaming agent were added to the resultant master batch in a ration according to the formulation shown in Table 9, and roll-kneaded at a roll temperature of 110° C. to prepare a resin composition.

Using a mold having a thickness of 10 mm, the resultant resin composition was pressed at 164° C. for 15 minutes to give a molded foam.

The resultant resin compositions (molded foams) were analyzed according to the measurement methods mentioned below to evaluate the physical properties thereof. For reference, measured data of a case not containing a hydrogenated block copolymer and EVA are shown in the Table as Reference Example f.
(Resin)
Ethylene-propylene-diene copolymer rubber (EPDM): "Esprene 501A", available from Sumitomo Chemical Co., Ltd.
Ethylene-vinyl acetate copolymer (EVA): "Ultracene 640", available from Tosoh Corporation
(Crosslinking Agent)
Peroxide-base crosslinking agent ("Perkadox 14/40", available from Kayaku Akzo Co., Ltd.) [mixture of bis(t-butyldioxyisopropyl)benzene (40% by mass), calcium carbonate (55.3% by mass), and amorphous silica diluted product (4.7% by mass)]
(Foaming Agent)
Azodicarbonamide-base complex foaming agent ("Cellmike CAP-500", available from Sankyo Chemical Co., Ltd.) (decomposition temperature 155° C., gas flow rate: 160 mL/g)
(Filler)
Filler 1: calcium carbonate
Filler 2: carbon black
(Plasticizer)
"Diana Process Oil PW-380", paraffinic oil, kinematic viscosity at 40° C.: 381.6 mm$^2$/s, available from Idemitsu Kosan Co., Ltd.
<Physical Properties of Resin Composition>
(tan δ (tension, 10 Hz))
This was measured according to the same method as that for "tan δ (tension, 10 Hz)" shown in Table 4.

TABLE 9

|  |  | Reference Example f | Example 21 | Example 22 | Example 23 | Comparative Example 13 |
|---|---|---|---|---|---|---|
| EPDM | part by mass | 34 | 24 | 24 |  | 24 |
| EVA |  |  |  |  | 24 |  |
| TPE-2 |  |  | 30 |  |  |  |
| TPE-3 |  |  |  | 30 | 30 |  |
| TPE-4' |  |  |  |  |  | 30 |

TABLE 9-continued

|  |  | Reference Example f | Example 21 | Example 22 | Example 23 | Comparative Example 13 |
|---|---|---|---|---|---|---|
| Crosslinking agent |  | 0.7 | 0.7 | 0.7 | 0.7 | 0.7 |
| Foaming agent |  | 5 | 5 | 5 | 5 | 5 |
| Filler 1 |  | 20 | 14 | 14 | 14 | 14 |
| Filler 2 |  | 20 | 14 | 14 | 14 | 14 |
| Plasticizer |  | 20 | 14 | 14 | 14 | 14 |
| tanδ | 0° C. | 0.18 | 0.40 | 0.32 | 0.41 | 0.17 |
| (tension, | 20° C. | 0.15 | 1.20 | 0.81 | 0.75 | 0.16 |
| 10 Hz) | 40° C. | 0.15 | 0.50 | 0.85 | 0.77 | 0.15 |

From Table 9, it is known that the resin compositions of Examples 21 to 23 have a larger value of tan δ in a temperature range of 0° C. to 40° C. than the resin composition of Comparative Example 13 and the resin composition of Reference Example f, and exhibit high vibration damping performance in a broad temperature range from a low temperature to a relatively high temperature.

Examples 24 and 25, Comparative Example 14, Reference Example g

According to the same method as in Example 4 and according to the formulation shown in Table 10 but changing the cylinder temperature to 230° C., resin compositions were produced.

The resultant resin compositions were analyzed according to the measurement methods mentioned below to evaluate the physical properties thereof. For reference, measured data of a case of TPV alone are shown in the Table as Reference Example g.
(Resin)
Olefinic, dynamically-crosslinked thermoplastic elastomer (TPV): "Santoprene 201-55", available from Exxon Mobile Corporation
<Physical Properties of Resin Composition>
(Tan δ (Tension, 10 Hz))
This was measured according to the same method as that for "tan δ (tension, 10 Hz)" shown in Table 4.
(Tensile Characteristics)
These were measured according to the same methods as those for the measurement method for tensile characteristics shown in Table 4 to determine the tensile strength [MPa] and the tensile elongation at break [%] thereof.
(Hardness (Shore A))
This was measured according to the same method as that for "hardness (Shore A)" shown in Table 4.
(MFR (230° C., 2.16 kg))
This was measured according to JIS K 7210 (2014).

TABLE 10

|  |  | Reference Example g | Example 24 | Example 25 | Comparative Example 14 |
|---|---|---|---|---|---|
| TPV | part by | 100 | 90 | 90 | 90 |
| TPE-2 | mass |  | 10 |  |  |
| TPE-3 |  |  |  | 10 |  |
| TPE-4' |  |  |  |  | 10 |
| tanδ | 0° C. | 0.15 | 0.25 | 0.18 | 0.14 |
| (tension, 10 | 20° C. | 0.13 | 0.46 | 0.34 | 0.14 |
| Hz) | 40° C. | 0.13 | 0.23 | 0.37 | 0.13 |
| Tensile strength [MPa] |  | 3.4 | 3.4 | 3.4 | 3.2 |
| Tensile elongation at break [%] |  | 202 | 385 | 391 | 262 |

TABLE 10-continued

|  | Reference Example g | Example 24 | Example 25 | Comparative Example 14 |
|---|---|---|---|---|
| Hardness (Shore A) | 60 | 59 | 58 | 59.8 |
| MFR (230° C., 2.16 kg) | 3.1 | 7.6 | 8.3 | 2 |

As in Table 10, the resin compositions of Examples 24 and 25 have a larger tensile elongation at break and a larger value of MFR than the resin composition of Comparative Example 14 and the sample of Reference Example g, and in addition, these have a larger tensile strength than the resin composition of Comparative Example 14. Moreover, the resin compositions of Examples 24 and 25 have a larger value of tan δ in a temperature range of 0° C. to 40° C. than the samples of Comparative Example 14 and Reference Example g, and are known to exhibit high vibration damping performance in a broad temperature range from a low temperature to a relatively high temperature.

Examples 26 and 27, Comparative Example 15, Reference Example h

According to the same method as in Example 4 and according to the formulation shown in Table 11 but changing the cylinder temperature to 230° C., resin compositions were produced.

The resultant resin compositions were analyzed according to the measurement methods mentioned below to evaluate the physical properties thereof. For reference, measured data of a case of ABS alone are shown in the Table as Reference Example h.
(Resin)
Acrylonitrile-butadiene-styrene copolymer (ABS): "Techno ABS110N", available from Techno UMG Corporation
<Physical Properties of Resin Composition>
(Loss Factor)
This was measured according to the same measurement method for loss factor shown in Table 7, at a temperature of 0° C., 20° C. and 40° C.

TABLE 11

|  |  | Reference Example h | Example 26 | Example 27 | Comparative Example 15 |
|---|---|---|---|---|---|
| ABS | part by | 100 | 90 | 90 | 90 |
| TPE-2 | mass |  | 10 |  |  |
| TPE-3 |  |  |  | 10 |  |
| TPE-4' |  |  |  |  | 10 |

TABLE 11-continued

|  | Reference Example h | Example 26 | Example 27 | Comparative Example 15 |
|---|---|---|---|---|
| Loss factor (0° C.) | 0.006 | 0.023 | 0.013 | 0.008 |
| Loss factor (20° C.) | 0.007 | 0.043 | 0.020 | 0.007 |
| Loss factor (40° C.) | 0.010 | 0.032 | 0.050 | 0.011 |

As in Table 11, the resin compositions of Examples 26 and 27 have a larger value of loss factor in a temperature range of 0° C. to 40° C. than the resin composition of Comparative Example 15 and the sample of Reference Example h, and are known to have high vibration damping performance in a broad temperature range of from a low temperature to a relatively high temperature.

Examples 28 and 29, Comparative Example 16, Reference Example i

According to the same method as in Example 4 and according to the formulation shown in Table 12 but changing the cylinder temperature to 250° C., resin compositions were produced.

The resultant resin compositions were analyzed according to the measurement methods mentioned below to evaluate the physical properties thereof. For reference, measured data of a case of nylon 6 alone are shown in the Table as Reference Example i.

(Resin)

Nylon 6: "UBE Nylon 1013B", available from Ube Kosan Co., Ltd.

<Physical Properties of Resin Composition>

(Loss Factor)

This was measured according to the same measurement method for loss factor shown in Table 7, at a temperature of 0° C., 20° C. and 40° C.

TABLE 12

|  |  | Reference Example i | Example 28 | Example 29 | Comparative Example 16 |
|---|---|---|---|---|---|
| Nylon 6 | part by mass | 100 | 90 | 90 | 90 |
| TPE-2 |  |  | 10 |  |  |
| TPE-3 |  |  |  | 10 |  |
| TPE-4' |  |  |  |  | 10 |
| Loss factor (0° C.) |  | 0.020 | 0.050 | 0.030 | 0.020 |
| Loss factor (20° C.) |  | 0.030 | 0.100 | 0.060 | 0.030 |
| Loss factor (40° C.) |  | 0.090 | 0.100 | 0.110 | 0.070 |

As in Table 12, the resin compositions of Examples 28 and 29 have a larger value of loss factor in a temperature range of 0° C. to 40° C. than the resin composition of Comparative Example 16 and the sample of Reference Example i, and are known to have high vibration damping performance in a broad temperature range of from a low temperature to a relatively high temperature.

Examples 30 and 31, Comparative Example 17, Reference Example j

According to the same method as in Example 4 and according to the formulation shown in Table 13 but changing the cylinder temperature to 270° C., resin compositions were produced.

The resultant resin compositions were analyzed according to the measurement methods mentioned below to evaluate the physical properties thereof. For reference, measured data of a case of PBT alone are shown in the Table as Reference Example j.

(Resin)

Polybutylene terephthalate (PBT): "Toraycon 1401X31", available from Toray Industries, Inc.

<Physical Properties of Resin Composition>

(Loss Factor)

This was measured according to the same measurement method for loss factor shown in Table 7, at a temperature of 0° C., 20° C. and 40° C.

TABLE 13

|  |  | Reference Example j | Example 30 | Example 31 | Comparative Example 17 |
|---|---|---|---|---|---|
| PBT | part by mass | 100 | 90 | 90 | 90 |
| TPE-2 |  |  | 10 |  |  |
| TPE-3 |  |  |  | 10 |  |
| TPE-4' |  |  |  |  | 10 |
| Loss factor (0° C.) |  | 0.008 | 0.021 | 0.008 | 0.009 |
| Loss factor (20° C.) |  | 0.008 | 0.053 | 0.015 | 0.007 |
| Loss factor (40° C.) |  | 0.020 | 0.033 | 0.060 | 0.017 |

As in Table 13, the resin compositions of Examples 30 and 31 have a larger value of loss factor in a temperature range of 20° C. to 40° C. than the resin composition of Comparative Example 17 and the sample of Reference Example j, and are known to have high vibration damping performance in a temperature range suitable for practical use. In particular, the resin composition of Example 30 has a larger value of loss factor even at 0° C. than the resin composition of Comparative Example 17 and the sample of Reference Example j, and is known to have high vibration damping performance even at a low temperature.

Examples 32 to 35, Comparative Example 18, Reference Example k

According to the same method as in Example 4 and according to the formulation shown in Table 14 but changing the cylinder temperature to 280° C., resin compositions were produced.

The resultant resin compositions were analyzed according to the measurement methods mentioned below to evaluate the physical properties thereof. For reference, measured data of a case of polycarbonate alone are shown in the Table as Reference Example k.

(Resin)

Polycarbonate: "Iupilon S-3000", available from Mitsubishi Engineering Plastics Corporation <Physical Properties of Resin Composition>

(Loss Factor)

This was measured according to the same measurement method for loss factor shown in Table 7, at a temperature of 0° C., 20° C. and 40° C.

TABLE 14

|  |  | Reference Example k | Example 32 | Example 33 | Example 34 | Example 35 | Comparative Example 18 |
|---|---|---|---|---|---|---|---|
| Polycarbonate | part by mass | 100 | 90 | 90 | 94 | 94 | 90 |
| TPE-2 | | | 10 | | 6 | | |
| TPE-3 | | | | 10 | | 6 | |
| TPE-4' | | | | | | | 10 |
| Loss factor (0° C.) | | 0.013 | 0.024 | 0.013 | 0.019 | 0.013 | 0.013 |
| Loss factor (20° C.) | | 0.008 | 0.043 | 0.024 | 0.029 | 0.015 | 0.008 |
| Loss factor (40° C.) | | 0.006 | 0.024 | 0.037 | 0.015 | 0.020 | 0.006 |

As in Table 14, the resin compositions of Examples 32 to 35 have the same value or a larger value of loss factor in a temperature range of 0° C. to 40° C. as or than the resin composition of Comparative Example 18 and the sample of Reference Example k, and are known to have high vibration damping performance in a broad temperature range of from a low temperature to a relatively high temperature.

Examples 36 and 37, Comparative Example 19, Reference Example 1

According to the same method as in Example 4 and according to the formulation shown in Table 15, resin compositions were produced.

The resultant resin compositions were analyzed according to the measurement methods mentioned below to evaluate the physical properties thereof. For reference, measured data of a case of POM alone are shown in the Table as Reference Example 1.
(Resin)
Polyacetal (POM): "Duracon M90-44", available from Polyplastics Co., Ltd.
<Physical Properties of Resin Composition>
(Loss Factor)
This was measured according to the same measurement method for loss factor shown in Table 7.

TABLE 15

|  |  | Reference Example 1 | Example 36 | Example 37 | Comparative Example 19 |
|---|---|---|---|---|---|
| POM | part by mass | 100 | 90 | 90 | 90 |
| TPE-2 | | | 10 | | |
| TPE-3 | | | | 10 | |
| TPE-4' | | | | | 10 |
| Loss factor (0° C.) | | 0.017 | 0.025 | 0.017 | 0.019 |
| Loss factor (20° C.) | | 0.018 | 0.086 | 0.022 | 0.019 |
| Loss factor (40° C.) | | 0.019 | 0.024 | 0.101 | 0.021 |
| Loss factor (60° C.) | | 0.023 | 0.025 | 0.029 | 0.021 |
| Loss factor (80° C.) | | 0.021 | 0.024 | 0.025 | 0.022 |
| Loss factor (100° C.) | | 0.025 | 0.026 | 0.027 | 0.026 |

As in Table 15, the resin compositions of Examples 36 and 37 have the same value or a larger value of loss factor in a temperature range of 0° C. to 100° C. as or than the resin composition of Comparative Example 19 and the sample of Reference Example 1, and are known to have high vibration damping performance in a broad temperature range of from a low temperature to a high temperature.

Examples 38 and 39, Comparative Example 20, Reference Example m

According to the same method as in Example 4 and according to the formulation shown in Table 16 but changing the cylinder temperature to 250° C., resin compositions were produced.

The resultant resin compositions were analyzed according to the measurement methods mentioned below to evaluate the physical properties thereof. For reference, measured data of a case of PPE and polystyrene alone are shown in the Table as Reference Example m.
(Resin)
Polyphenylene ether (PPE): "NORYL 640", available from SABIC Innovation Plastics Corporation
Polystyrene: "Toyostyrol G210C", available from Toyo Styrene Co., Ltd.
<Physical Properties of Resin Composition>
(Loss Factor)
This was measured according to the same method for "loss factor" shown in Table 7.

TABLE 16

|  |  | Reference Example m | Example 38 | Example 39 | Comparative Example 20 |
|---|---|---|---|---|---|
| PPE | part by mass | 50 | 45 | 45 | 45 |
| Polystyrene | | 50 | 45 | 45 | 45 |
| TPE-2 | | | 10 | | |
| TPE-3 | | | | 10 | |
| TPE-4' | | | | | 10 |
| Loss factor (0° C.) | | 0.006 | 0.030 | 0.008 | 0.019 |
| Loss factor (20° C.) | | 0.007 | 0.062 | 0.025 | 0.013 |
| Loss factor (40° C.) | | 0.010 | 0.031 | 0.044 | 0.013 |
| Loss factor (60° C.) | | 0.013 | 0.025 | 0.056 | 0.016 |
| Loss factor (80° C.) | | 0.017 | 0.025 | 0.050 | 0.020 |
| Loss factor (100° C.) | | 0.021 | 0.030 | 0.042 | 0.025 |

As in Table 16, the resin compositions of Examples 38 and 39 have a larger value of loss factor in a temperature range of 0° C. to 100° C. than the resin composition of Comparative Example 20 and the sample of Reference Example m, and are known to have high vibration damping performance in a broad temperature range of from a low temperature to a high temperature.

Examples 40 and 41, Comparative Example 21, Reference Example n

According to the same method as in Example 4 and according to the formulation shown in Table 17 but changing the cylinder temperature to 270° C., resin compositions were produced.

The resultant resin compositions were analyzed according to the measurement methods mentioned below to evaluate the physical properties thereof. For reference, measured data of a case of nylon 6, PPE and maleic anhydride alone are shown in the Table as Reference Example n.
(Resin)
Nylon 6: "UBE Nylon 1013B", available from Ube Kosan Co., Ltd.
Polyphenylene ether (PPE): "NORYL 640", available from SABIC Innovation Plastics Corporation <Physical Properties of Resin Composition>
(Loss Factor)

This was measured at a temperature of 0° C., 20° C. and 40° C. according to the same method for loss factor shown in Table 7.

TABLE 17

|  |  | Reference Example n | Example 40 | Example 41 | Comparative Example 21 |
|---|---|---|---|---|---|
| Nylon 6 | part by | 50 | 45 | 45 | 45 |
| PPE | mass | 50 | 45 | 45 | 45 |
| TPE-2 |  |  | 10 |  |  |
| TPE-3 |  |  |  | 10 |  |
| TPE-4' |  |  |  |  | 10 |
| Maleic anhydride |  | 0.5 | 0.5 | 0.5 | 0.5 |
| Loss factor (0° C.) |  | 0.010 | 0.040 | 0.010 | 0.013 |
| Loss factor (20° C.) |  | 0.010 | 0.058 | 0.030 | 0.011 |
| Loss factor (40° C.) |  | 0.013 | 0.043 | 0.051 | 0.012 |

As in Table 17, the resin compositions of Examples 40 and 41 have a larger value of loss factor in a temperature range of 20° C. to 40° C. than the resin composition of Comparative Example 21 and the resin composition of Reference Example n, and are known to have high vibration damping performance in a temperature range suitable for practical use. In particular, the resin composition of Example 40 has a larger value of loss factor even at 0° C. than those of Comparative Example 21 and Reference Example n, and are known to have high vibration damping performance even at a low temperature.

Examples 42 and 43, Comparative Example 22, Reference Example o

According to the same method as in Example 4 and according to the formulation shown in Table 18 but changing the cylinder temperature to 300° C., resin compositions were produced.

The resultant resin compositions were analyzed according to the measurement methods mentioned below to evaluate the physical properties thereof. For reference, measured data of a case of PPS alone are shown in the Table as Reference Example o.
(Resin)
Polyphenylene sulfide (PPS): "Toraylina A900", available from Toray Industries, Inc.
<Physical Properties of Resin Composition>
(Loss Factor)

This was measured at a temperature of 0° C., 20° C., 40° C. and 60° C. according to the same method for loss factor shown in Table 7.

TABLE 18

|  |  | Reference Example o | Example 42 | Example 43 | Comparative Example 22 |
|---|---|---|---|---|---|
| PPS | part by | 100 | 90 | 90 | 90 |
| TPE-2 | mass |  | 10 |  |  |
| TPE-3 |  |  |  | 10 |  |
| TPE-4' |  |  |  |  | 10 |
| Loss factor (0° C.) |  | 0.008 | 0.025 | 0.013 | 0.008 |
| Loss factor (20° C.) |  | 0.008 | 0.035 | 0.024 | 0.007 |
| Loss factor (40° C.) |  | 0.006 | 0.030 | 0.035 | 0.006 |
| Loss factor (60° C.) |  | 0.007 | 0.027 | 0.030 | 0.007 |

As in Table 18, the resin compositions of Examples 42 and 43 have a larger value of loss factor in a temperature range of 0° C. to 60° C. than the resin composition of Comparative Example 22 and the sample of Reference Example o, and are known to have high vibration damping performance in a broad temperature range of from 0° C. to 60° C.

INDUSTRIAL APPLICABILITY

The hydrogenated block copolymer and the resin composition of the present invention are useful as a vibration damping material, an acoustic insulating material, shoe sole material, a floor material, a gear, a gear box, a vibration damping coating material, a bonding adhesive or a pressure-sensitive adhesive. Further, these are also useful as automobile parts, for example, as cooling parts such as a thermostat housing, a radiator tank, a radiator hose, a water outlet, a water pump housing, and a rear joint; air intake and exhaust system parts such as an intercooler tank, an intercooler case, a turbo duct pipe, an EGR cooler case, a resonator, a throttle body, an intake manifold, and a tail pipe; fuel system parts such as a fuel delivery pipe, a gasoline tank, a quick connector, a canister, a pump module, a fuel pipe, an oil strainer, a lock nut, and a sealant material; structural parts such as a mount bracket, a torque rod, and a cylinder head cover; drive system parts such as a bearing retainer, a gear tensioner, a head lamp actuator gear, an HVAC gear, a slide door roller, and clutch spherical components; brake system parts such as an air brake tube; on-vehicle electrical components such as an engine compartment wire harness connector, a motor part, a sensor, an ABS bobbin, a combination switch, an on-vehicle switch, and an electronic control unit (ECU) box; and interior and exterior parts such as slide door damper, a door mirror stay, a door mirror bracket, an inner mirror stay, a roof rail, an engine mount bracket, an air cleaner inlet pipe, a door checker, a plastic chain, an emblem, a clip, a breaker cover, a cup holder, an air bag, a fender, a spoiler, a radiator support, a radiator grill, a louver, an air scoop, hood bulge, a back door, a fuel sender module, a floor mat, an instrument panel, a dash board, a dash insulator, a rubber dam, a weather strip and a tire.

Also in a field of household appliances, they are usable as bonding adhesives, pressure-sensitive adhesives, sealant materials, packings, O rings, belts and acoustic insulating materials in various electric appliances such as televisions, various recorders such as a blue ray recorder and a HDD recorder, as well as projectors, game machines, digital cameras, home videos, antennas, speakers, electronic dictionaries, IC recorders, FAX machines, copying machines, telephones, door phones, rice cookers, microwave ovens, ovens, refrigerators, dishwashers, dish driers, IH cooking heaters, hot plates, vacuum cleaners, washing machines, rechargers, sewing machines, clothes irons, driers, electric vehicles, air cleaners, water cleaners, electric toothbrushes, lighting equipment, air conditioners, air conditioner outdoor units, dehumidifiers, and humidifiers.

REFERENCE SIGNS LIST

1: Polymer Block (A)
2: Polymer Block (B)

The invention claimed is:
1. A block copolymer hydrogenate, which is a hydrogenate of a block copolymer having a polymer block (A) containing a structural unit derived from an aromatic vinyl compound in an amount of more than 70 mol %, and a polymer block (B) containing a structural unit derived from a conjugated diene compound in an amount of 30 mol % or more, and further satisfies the following requirements:

Requirement (1): The content of the polymer block (A) in the block copolymer hydrogenate is from 1 to 30% by mass;

Requirement (2): The conjugated diene compound contains isoprene;

Requirement (3): A total content of the 1,2-bond unit and the 3,4-bond unit in the structural units derived from the conjugated diene compound is 60 mol % or more;

Requirement (4): The hydrogenation rate of the polymer block (B) is 60 mol % or more; and Requirement (5): The block copolymer hydrogenate has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.0 or more, and the maximum width of the temperature range is 16° C. or more.

2. The block copolymer hydrogenate according to claim 1, wherein in the requirement (1), the content of the polymer block (A) in the block copolymer hydrogenate is from 2 to 18% by mass.

3. The block copolymer hydrogenate according to claim 1, wherein in the requirement (2), the conjugated diene compound contains isoprene in an amount of 20% by mass or more.

4. The block copolymer hydrogenate according to claim 1, wherein in the requirement (2), the conjugated diene compound contains isoprene in an amount of 90% by mass or more.

5. The block copolymer hydrogenate according to claim 1, wherein in the requirement (3), a total content of the 1,2-bond unit and the 3,4-bond unit in the structural units derived from the conjugated diene compound is 70 mol % or more.

6. The block copolymer hydrogenate according to claim 1, wherein in the requirement (4), the hydrogenation rate of the polymer block (B) is 80 mol % or more.

7. The block copolymer hydrogenate according to claim 1, wherein the conjugated diene compound is a mixture of isoprene and butadiene, and a ratio of the peak area at a chemical shift value of 24 to 25 ppm to the peak area at a chemical shift value of 5 to 50 ppm, as measured according to $^{13}$C-NMR, is 4% or less.

8. The block copolymer hydrogenate according to claim 1, having a weight-average molecular weight of 20,000 to 800,000.

9. The block copolymer hydrogenate according to claim 1, wherein a morphology of a film having a thickness of 1 mm thereof, as prepared by molding under the following molding condition, has a spherical microphase separation structure:

Molding condition: Pressing at a temperature of 230° C. under a pressure of 10 MPa for 3 minutes.

10. The block copolymer hydrogenate according to claim 1, further satisfying the following requirement (6):

Requirement (6): The block copolymer hydrogenate has a serial temperature range where tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.5 or more, and the maximum width of the temperature range is 9° C. or more.

11. The block copolymer hydrogenate according to claim 1, further satisfying the following requirement (7):

Requirement (7): A maximum value of the peak intensity at tan δ, as measured according to JIS K7244-10 (2005) and under the conditions of a strain of 0.1%, a frequency of 1 Hz, a measurement temperature of −70 to 100° C. and a rate of temperature increase of 3° C./min, is 1.7 or more.

12. The block copolymer hydrogenate according to claim 1, further satisfying the following requirement (8):

Requirement (8): The hydrogenation rate of the aromatic vinyl compound in the polymer block (A) is 8 mol % or less.

13. The block copolymer hydrogenate according to claim 1, containing 2,2-di(2-tetrahydrofuryl)propane.

14. The block copolymer hydrogenate according to claim 1, which contains none of dimethyl ether, diethyl ether, tetrahydrofuran (THF), ethylene glycol dimethyl ether, diethylene glycol dimethyl ether, triethylamine, N,N,N',N'-tetramethylenediamine (TMEDA) and N-methylmorpholine, or in which the content of these is 1 ppm or less each.

15. A resin composition containing the block copolymer hydrogenate of claim 1.

16. A molded article produced by molding the block copolymer hydrogenate of claim 1.

17. A vibration damping material containing the block copolymer hydrogenate of claim 1.

18. A sound insulator containing the block copolymer hydrogenate of claim 1.

19. A bonding adhesive or a pressure-sensitive adhesive containing the block copolymer hydrogenate of claim 1.

20. A laminate having an X layer that contains the block copolymer hydrogenate of claim 1, and a Y layer laminated on at least one surface of the X layer.

* * * * *